US012689976B2

(12) United States Patent
Chen et al.

(10) Patent No.: US 12,689,976 B2
(45) Date of Patent: Jul. 21, 2026

(54) METHOD AND APPARATUS FOR REMOTE UE MOBILITY MANAGEMENT

(71) Applicant: INTERDIGITAL PATENT HOLDINGS, INC., Wilmington, DE (US)

(72) Inventors: Zhuo Chen, Claymont, DE (US); Pascal Adjakple, Great Neck, NY (US); Kyle Pan, Saint James, NY (US); Yifan Li, Conshohocken, PA (US); Joseph Murray, Schwenksville, PA (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 571 days.

(21) Appl. No.: 18/250,072

(22) PCT Filed: Oct. 21, 2021

(86) PCT No.: PCT/US2021/056019
§ 371 (c)(1),
(2) Date: Apr. 21, 2023

(87) PCT Pub. No.: WO2022/087244
PCT Pub. Date: Apr. 28, 2022

(65) Prior Publication Data
US 2023/0397100 A1 Dec. 7, 2023

Related U.S. Application Data

(60) Provisional application No. 63/094,442, filed on Oct. 21, 2020.

(51) Int. Cl.
*H04W 48/20* (2009.01)
*H04W 72/25* (2023.01)

(52) U.S. Cl.
CPC ........... *H04W 48/20* (2013.01); *H04W 72/25* (2023.01)

(58) Field of Classification Search
CPC ............................. H04W 48/20; H04W 72/25
(Continued)

(56) References Cited

U.S. PATENT DOCUMENTS

2015/0208414 A1* 7/2015 Ji ........................... H04W 48/20
455/454
2016/0286374 A1* 9/2016 Baghel .................. H04W 24/10
(Continued)

FOREIGN PATENT DOCUMENTS

WO 2017/196611 A1 11/2017

OTHER PUBLICATIONS

Huawei, HiSilicon, "Procedure of Relay-UE selection and reselection," 3GPP TSG-RAN WG2 Meeting #91, R2-153403, Aug. 24-28, 2015, pp. 4.
(Continued)

*Primary Examiner* — Michael R Neff
(74) *Attorney, Agent, or Firm* — Flaster Greenberg P.C.

(57) ABSTRACT
Methods and apparatuses are described herein for remote UE mobility management. Methods are proposed to consider the impact of coverage through PC5 interface when a remote UE is doing the cell (re)selection. A remote UE may select a serving cell considering the impact of coverage through PC5 interface when the remote UE and the Relay UE are in coverage of different cells. The remote UE may detect and reselect a cell via the Uu interface while it has selected a serving cell via a Relay UE. The remote UE may detect and reselect to a cell via a Relay UE while it has selected a serving cell via the Uu interface.

20 Claims, 23 Drawing Sheets

500

(58) Field of Classification Search
USPC ........................................................ 455/434
See application file for complete search history.

(56) References Cited

U.S. PATENT DOCUMENTS

| 2016/0330676 A1* | 11/2016 | Thangarasa ........... H04W 48/20 |
| 2018/0092017 A1* | 3/2018 | Freda ..................... H04B 7/155 |
| 2018/0249516 A1 | 8/2018 | Jung et al. |
| 2018/0255505 A1* | 9/2018 | Thyagarajan ........ H04J 11/0069 |

OTHER PUBLICATIONS

ZTE, "Relay selection and reselection," 3GPP TSG RAN WG2 #90, R2-152547, May 25-29, 2015, pp. 4.
3GPP Tr 36.746, Study on further enhancements to LTE Device to Device (D2D), User Equipment (UE) to network relays for Internet of Things (IOT) and wearables; (Release 15), V15.1.1, 2018-04.
New SID: Study on NR Sidelink relay, 3GPP Tsg Ran Meeting #86, RP-193118, Sitges, Spain, Dec. 9 - 12, 2019, pp. 1-5.

* cited by examiner

500

600

800

1000

1100

1200

1400

1600

102

115/116/117

122

METHOD AND APPARATUS FOR REMOTE UE MOBILITY MANAGEMENT

CROSS-REFERENCE TO RELATED APPLICATIONS

This application is the National Stage Application of International Patent Application No. PCT/US2021/056019, filed Oct. 21, 2021, which claims the benefit of U.S. Provisional Patent Application No. 63/094,442, filed Oct. 21, 2020, which is hereby incorporated by reference in its entirety.

BACKGROUND

Several use cases have been identified for supporting remote UE and relay UE operations. Accordingly, there is a need for improved support for remote UE mobility management such as for cell (re)selection, paging reception and RRC connection establishment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for remote UE mobility management. Methods are proposed to consider the impact of coverage through PC5 interface when a remote UE is doing the cell (re)selection. A remote UE may select a serving cell considering the impact of coverage through PC5 interface when the remote UE and the Relay UE are in coverage of different cells. The remote UE may detect and reselect a cell via the Uu interface while it has selected a serving cell via a Relay UE. The remote UE may detect and reselect to a cell via a Relay UE while it has selected a serving cell via the Uu interface.

In another embodiment, a path may be (re)selected for paging reception in the case where the remote UE is in coverage of the serving cell through the Uu interface and the PC5 interface. A remote UE may initiate a paging path selection assisted by the information provided by the network. A relay UE may initiate a paging path selection using information provided by the network.

In another embodiment, the path(s), may be determined, to establish the RRC connection between the gNB and remote UE. The path(s) may be determined to establish the RRC connection between the gNB and remote UE for a Mobile Originated traffic. The path(s) may be determined to establish the RRC connection between the gNB and remote UE for a Mobile Terminated traffic.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION OF ILLUSTRATIVE EMBODIMENTS

Methods and apparatuses are described herein for remote UE mobility management.

Figure 1:
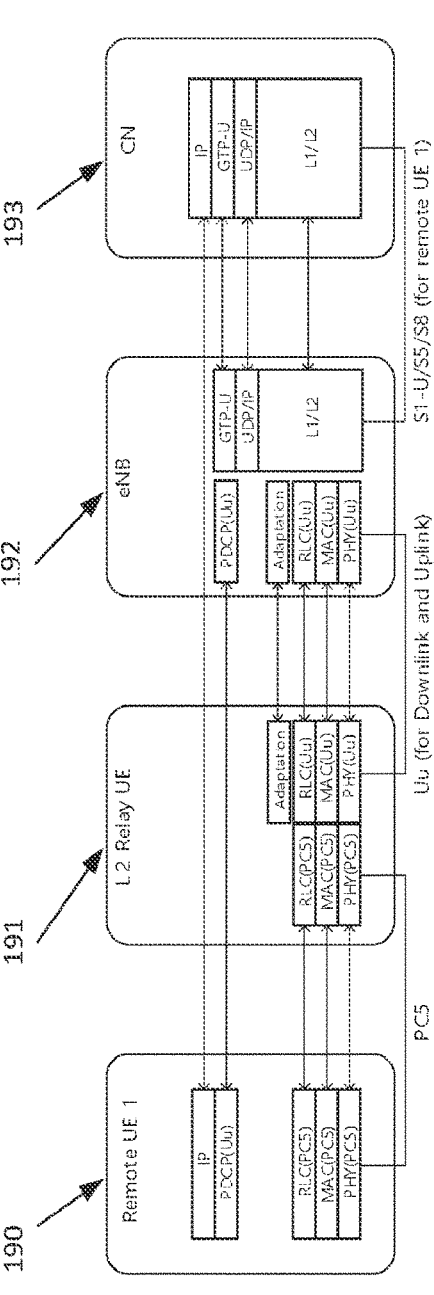
FIG. 1 shows an example user plane radio protocol stack for layer 2 evolved UE-to-Network relay (PC5)

The following abbreviations and definitions may be used herein:

3GPP 3$^{rd}$ Generation Partnership Project
ACK ACKnowledgement
APP APPlication
AS Access Stratum
DAG Directed Acyclic Graph
D2D Device to Device Communication
eNB Evolved Node B
gNB NR NodeB
ID Identity or Identifier
ITS Intelligent Transport System
ITS-AID ITS Application Identifier
LCH Logical Channel
LTE Long Term Evolution
MAC Medium Access Control
MO Mobile Orientated
MT Mobile Terminated
NAS Non-AS
NB NodeB
NR New Radio
PC5 The reference point between ProSe-enabled UEs used for control and user plane for ProSe Direct Discovery, ProSe Direct Communication and ProSe UE-to-Network Relay
PCF Policy Charging Function
PDCP Packet Data Convergence Protocol
PDN Packet Data Network
PDU Protocol Data Unit
PHY PHYsical layer
ProSe Proximity-Based Services
PSID Provider Service Identifier
QoS Quality of Service
SDU Service Data Unit
SL Sidelink
RAN Radio Access Network
RAP Relay Adaptation Protocol
RLC Radio Link Control
RLF Radio Link Failure
RRC Radio Resource Control
RSU Roadside Unit
UE User Equipment
UL Uplink
ULG Upper Layer Group
V2X Vehicle-to-X Communication FIG. 1 shows an example protocol architecture for the user plane and control plane 50. In this example, relaying may be performed above the RLC sublayer. This example shows the user plane protocol stack and the control plane protocol stack, including the internet protocol (IP) layer, when PC5 is used between the evolved ProSe remote UE 190 and the evolved ProSe UE-to-Network Relay UE 191. The user plane and control plane data of the evolved ProSe Remote UE 190 may be relayed above the RLC via the evolved ProSe UE-to-Network Relay UE 191 from the evolved ProSe Remote UE 190 to the network 193 and vice versa. Uu PDCP and RRC are terminated between the evolved ProSe Remote UE 190 and the eNB 192 while RLC, MAC and PHY and the non-3GPP transport layers are terminated in each link (i.e. the link between the evolved ProSe Remote UE 190 and the evolved ProSe UE-to-Network Relay UE 191 and the link between the evolved ProSe UE-to-Network Relay UE 191 and the eNB 192).

Figure 2:
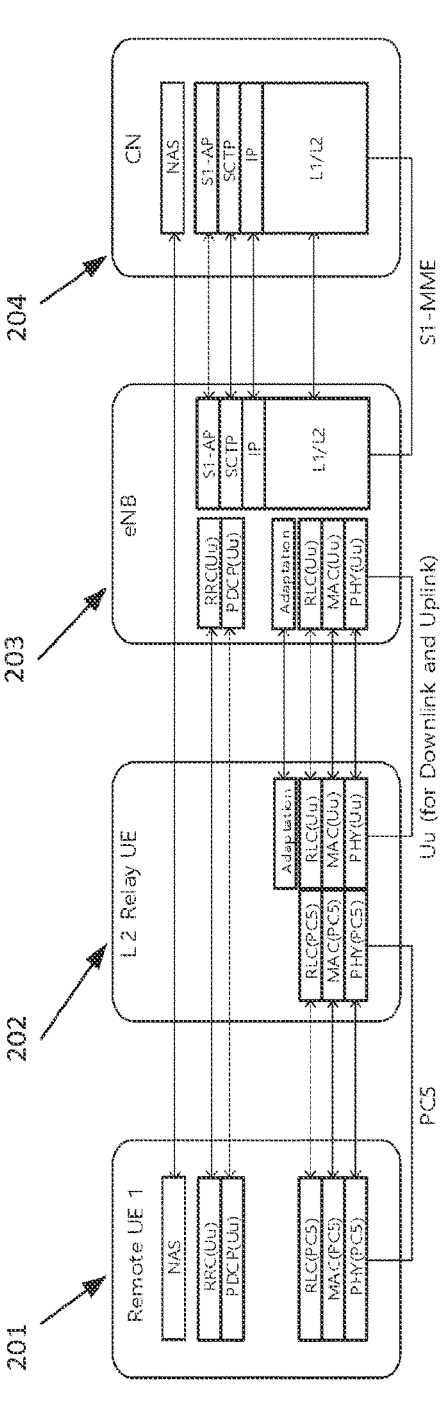
FIG. 2 shows an example Control plane radio protocol stack for layer 2 evolved UE-to-Network relay (PC5)

FIG. 2 shows an example protocol architecture for the user plane and control plane 200. In this example, relaying may be performed above the RLC sublayer. This example shows the user plane protocol stack and the control plane protocol stack, including the non-access stratum (NAS) and radio resource control (RRC) layers, when PC5 is used between the evolved ProSe remote UE 201 and the evolved ProSe UE-to-Network Relay UE 202. The user plane and control plane data of the evolved ProSe Remote UE 201 may be relayed above the RLC via the evolved ProSe UE-to-Network Relay UE 202 from the evolved ProSe Remote UE 201 to the network 204 and vice versa. Uu PDCP and RRC are terminated between the evolved ProSe Remote UE 201 and the eNB 203 while RLC, MAC and PHY and the non-3GPP transport layers are terminated in each link (i.e. the link between the evolved ProSe Remote UE 101 and the evolved ProSe UE-to-Network Relay UE 202 and the link between the evolved ProSe UE-to-Network Relay UE 202 and the eNB 203).

In LTE, if the UE detects at least one cell on the frequency which UE is configured to perform Sidelink operation on fulfilling the S criterion, it considers itself to be in-coverage for Sidelink operation on that frequency. If the UE cannot detect any cell on that frequency meeting the S criterion, it considers itself to be out-of-coverage for Sidelink operation on that frequency.

In NR the cell selection criterion S is fulfilled when:

$$Srxlev>0 \text{ AND } Squal>0$$

where:

$$Srxlev = Q_{rxlevmeas} - (Q_{rxlevmin} + Q_{rxlevminoffset}) - P_{compensation} - Qoffset_{temp}$$

$$Squal = Q_{qualmeas} - (Q_{qualmin} + Q_{qualminoffset}) - Qoffset_{temp}$$

where:

TABLE 1

| | |
|---|---|
| Srxlev | Cell selection RX level value (dB) |
| Squal | Cell selection quality value (dB) |
| $Qoffset_{temp}$ | Offset temporarily applied to a cell as specified in TS 38.331 (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN, as specified in TS 23.122. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122. |
| $P_{compensation}$ | For FR1, if the UE supports the additionalPmax in the NR-NS-PmaxList, if present, in SIB1, SIB2 and SIB4: max ($P_{EMAX1} - P_{PowerClass}$, 0) − (min ($P_{EMAX2}$, $P_{PowerClass}$) − min ($P_{EMAX1}$, $P_{PowerClass}$)) (dB); else: max ($P_{EMAX1} - P_{PowerClass}$, 0) (dB) For FR2, $P_{compensation}$ is set to 0. |

TABLE 1-continued

| | |
|---|---|
| $P_{EMAX1}$, $P_{EMAX2}$ | Maximum TX power level of a UE may use when transmitting on the uplink in the cell (dBm) defined as $P_{EMAX}$ in TS 38.101. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331, else $P_{EMAX1}$ and $P_{EMAX2}$ are obtained from the p-Max and NR-NS-PmaxList respectively in SIB1, SIB2 and SIB4 for normal UL as specified in TS 38.331. |
| $P_{PowerClass}$ | Maximum RF output power of the UE (dBm) according to the UE power class as defined in TS 38.101-1. |

In LTE, the Remote UE performs radio measurements at PC5 interface and uses these measurements for ProSe UE-to-Network Relay selection and reselection along with higher layer criterion, as specified in TS 23.303. A ProSe UE-to-Network Relay is considered suitable in terms of radio criteria if the PC5 link quality exceeds configured threshold (pre-configured or provided by eNB). The Remote UE selects the ProSe UE-to-Network Relay, which satisfies higher layer criterion and has best PC5 link quality among all suitable ProSe UE-to-Network Relays.

The Remote UE triggers ProSe UE-to-Network Relay reselection when:

PC5 signal strength of current ProSe UE-to-Network Relay is below configured signal strength threshold.

It receives a layer-2 link release message (upper layer message), as specified in TS 23.303, from ProSe UE-to-Network Relay.

A UE capable of Sidelink remote UE operation that is configured by upper layers to search for a Sidelink relay UE:

1> if out of coverage on the frequency used for Sidelink communication, as defined in TS 36.304, clause 11.4; or 1> if the serving frequency is used for Sidelink communication and the RSRP measurement of the cell on which the UE camps (RRC_IDLE)/the PCell (RRC_CONNECTED) is below threshHigh within remoteUE-Config:

2> search for candidate sidelink relay UEs, in accordance with TS 36.133

2> when evaluating the one or more detected sidelink relay UEs, apply layer 3 filtering as specified in 5.5.3.2 across measurements that concern the same ProSe Relay UE ID and using the filterCoefficient in SystemInformationBlockType19 (in coverage) or the preconfigured filterCoefficient as defined in 9.3(out of coverage), before using the SD-RSRP measurement results;

2> if the UE does not have a selected sidelink relay UE:

3> select a candidate sidelink relay UE which SD-RSRP exceeds q-RxLevMin included in either reselectionInfoIC (in coverage) or reselectionInfoOoC (out of coverage) by minHyst.

2> else if SD-RSRP of the currently selected sidelink relay UE is below q-RxLevMin included in either reselectionInfoIC (in coverage) or reselectionInfoOoC (out of coverage); or if upper layers indicate not to use the currently selected sidelink relay: (i.e. sidelink relay UE reselection):

3> select a candidate sidelink relay UE which SD-RSRP exceeds q-RxLevMin included in either reselectionInfoIC (in coverage) or reselectionInfoOoC (out of coverage) by minHyst.

2> else if the UE did not detect any candidate sidelink relay UE which SD-RSRP exceeds q-RxLevMin included in either reselectionInfoIC (in coverage) or reselectionInfoOoC (out of coverage) by minHyst:

3> consider no sidelink relay UE to be selected.

Release 17 Study Item

A described in RP-193118 New SID: Study on NR Sidelink relay, first version of NR Sidelink has been developed and it solely focuses on supporting V2X related road safety services in Release 16. The design aims to provide support for broadcast, groupcast and unicast communications in both out-of-coverage and in-network coverage scenarios. On top of that, Sidelink-based relaying functionality should be additionally studied for Sidelink/network coverage extension and power efficiency improvement, considering wider range of applications and services.

To further explore coverage extension for Sidelink-based communication:

UE-to-network coverage extension: Uu coverage reachability is necessary for UEs to reach server in PDN network or counterpart UE out of proximity area. However, release-13 solution on UE-to-network relay is limited to EUTRA-based technology, and thus cannot be applied to NR-based system, for both NG-RAN and NR-based Sidelink communication.

UE-to-UE coverage extension: Currently proximity reachability is limited to single-hop for the Sidelink communication, either via EUTRA-based or NR-based Sidelink technology. However, that is not enough in the scenario where there is no Uu coverage and satellite coverage, considering the limited single-hop Sidelink coverage.

Overall, Sidelink connectivity should be further extended in NR framework, in order to support the enhanced QoS requirements.

Figure 3:
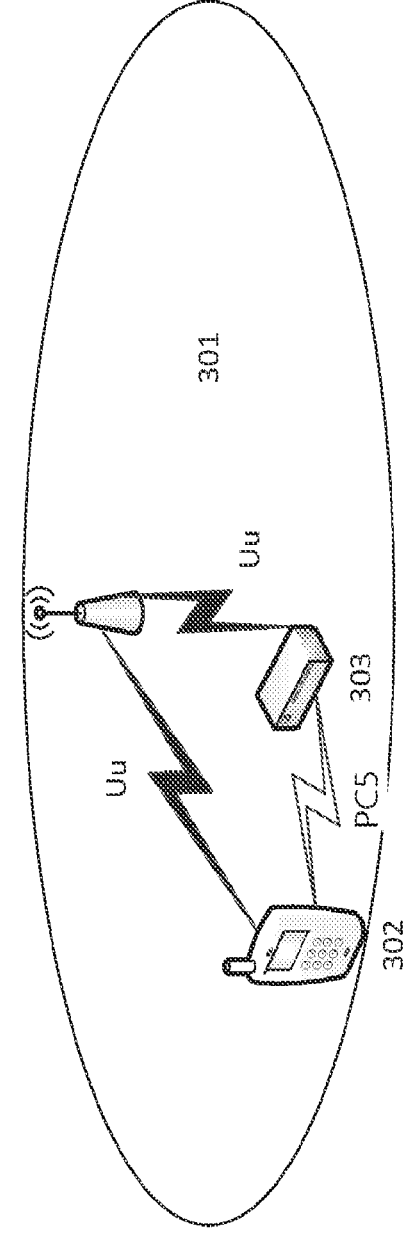
FIG. 3 shows an example of a remote UE and the Relay UE that are in coverage of the same cell.

FIG. 3 shows a first example use case 300. In the example of FIG. 3, the remote UE 302 is in coverage of the same cell 301 as a relay UE 303.

Figure 4:
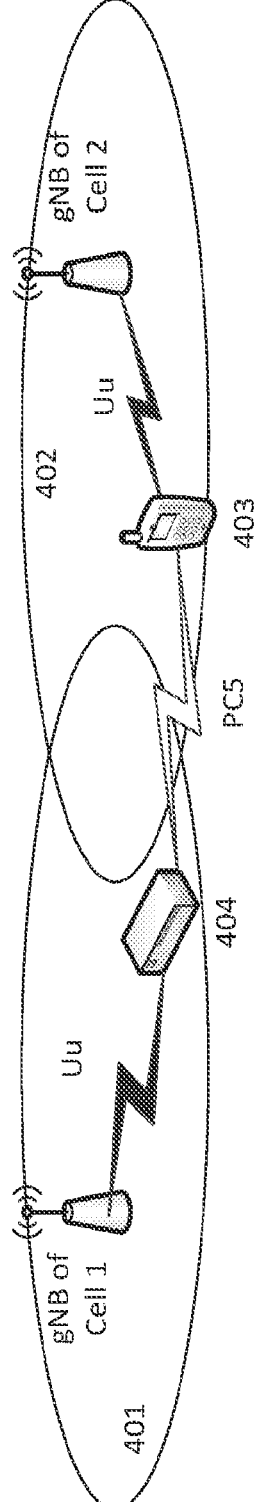
FIG. 4 shows an example of a remote UE and the Relay UE that are in coverage of different cells.

FIG. 4 shows a second example use case 400. In the example of FIG. 4, the remote UE 403 and the relay UE 404 are in coverage of different cells 401, 402. Note that cell 401 and 402 can be associated with the same gNB (e.g., each cell is a sector on the gNB that covers a different direction) or different gNBs.

Figure 5:
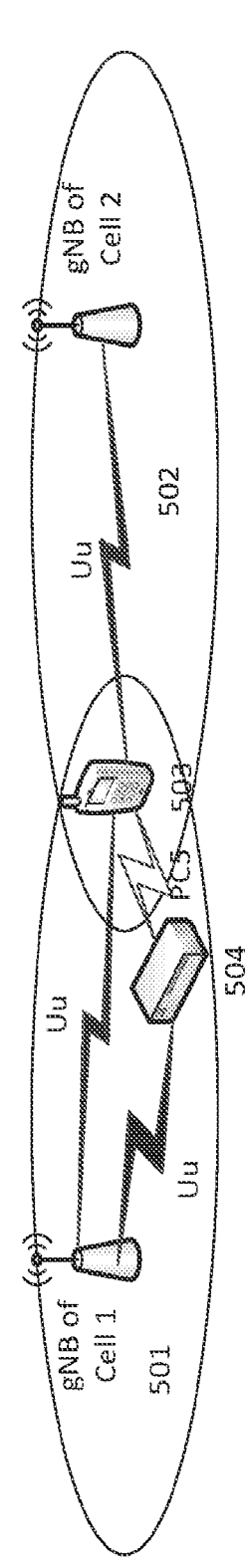
FIG. 5 shows an example of a remote UE and the Relay UE that are in coverage of the same cell and the remote UE is in coverage of another cell.

FIG. 5 shows a third example use case 500. In the example of FIG. 5, the remote UE 503 and the relay UE 504 are in coverage of the same cell 501, and the remote UE 503 is also in coverage of another cell 502. Note that cell 501 and 502 can be associated with the same gNB (e.g., each cell is a sector on the gNB that covers a different direction) or different gNBs.

One issue addressed by the techniques disclosed herein is that when UE powers on, it needs to perform cell search and cell selection. Furthermore, when a UE moves to a new area, it may need to (re)select a cell. In use case 2 described herein and depicted in FIG. 4, the remote UE may obtain cell information from two different cells, one is directly from Cell 2 on Uu interface, and the other is in-directly from Cell 1 via a relay UE on PC5 interface. Similarly, in use case 3 described herein and depicted in FIG. 5, the remote UE can obtain cell information from two different cells. One is directly from Cell 1 on Uu interface or indirectly from Cell 1 via a relay UE on PC5, and the other is directly from Cell 2 on Uu interface. In traditional cell selection procedure, the UE only does cell selection via Uu interface. However, since the relay UE may play an important role for a remote UE especially when the remote UE is a wearable device, new methods are needed to consider the impact of coverage through PC5 interface when a remote UE is doing the cell (re)selection.

Another issue addressed by the techniques disclosed herein is that after a remote UE (re)selects the serving cell and receives system information, the UE needs to monitor paging from the serving cell. In use case 1 depicted in FIG. 3, a UE may receive paging message both from the direct path and in-direct path. Therefore, methods are needed for paging reception in the case where the remote UE is in coverage of the serving cell through Uu interface and PC5 interface.

Another issue addressed by the techniques disclosed herein is that after a remote UE that is in RRC_IDLE/RRC_INACTIVE receives a paging message or its upper layer initiates a Mobile Originated traffic, the remote UE needs to establish RRC connection with the gNB. However, there may be more than one direct and in-direct path between a remote UE and the gNB. Therefore, methods are needed to determinate the path(s) to establish the RRC connection between the gNB and remote UE.

Methods are proposed to consider the impact of coverage through PC5 interface when a remote UE is doing the cell (re)selection.

Methods are proposed for a remote UE to select a serving cell considering the impact of coverage through PC5 interface when the remote UE and the Relay UE are in coverage of different cells.

A method is proposed for a remote UE to detect and reselect to a cell via Uu while it has selected a serving cell via a Relay UE.

A method is proposed for a remote UE to detect and reselect to a cell via a Relay UE while it has selected a serving cell via Uu.

Methods are proposed to (re)select a path for paging reception in the case where the remote UE is in coverage of the serving cell through Uu interface and PC5 interface Methods are proposed for a remote UE to initiate a paging path selection assisted by the information provided by the network.

Methods are proposed for a relay UE to initiate a paging path selection using information provided by the network.

Methods are proposed to determine the path(s) to establish the RRC connection between the gNB and remote UE.

A method is proposed to determine the path(s) to establish the RRC connection between the gNB and remote UE for a Mobile Originated traffic Methods are proposed to determine the path(s) to establish the RRC connection between the gNB and remote UE for a Mobile Terminated traffic.

Hereinafter the term "selecting a serving cell" may be used to refer the procedure by which a UE camps on a cell to receive service.

Hereinafter the term "suitable cell" may be used to refer to a cell that a UE may camp on. To be considered a suitable cell, the cell satisfies a set of conditions (e.g., with regards to PLMN and access barring).

Hereinafter the term "suitable relay UE" may be used to refer to a UE that may be used as UE-to-Network relay. To be considered a suitable relay UE, the relay UE satisfies a set of conditions (e.g., with regards to PLMN, access barring, link quality, and load).

Hereinafter the term "coverage over a Uu interface" may be used to mean that a UE has coverage to a cell over a Uu interface (e.g., the UE is in coverage of a gNB).

Hereinafter the term "coverage over a PC5 interface" may be used to mean that a UE has coverage to a cell over a PC5 interface (e.g., the UE is in coverage of a Relay UE).

Hereinafter the term "serving cell selected via a Uu interface" may be used to mean that a UE has selected it serving cell based on finding a suitable cell.

Hereinafter the term "serving cell selected via a PC5 interface" may be used to mean that a UE has selected it serving cell based on finding a suitable relay UE.

Hereinafter the term "paging path selection" may be used to refer to the procedure where a UE that is both in coverage over a Uu interface and in coverage over a PC5 interface, selects how it should be paged (over the Uu interface or over the PC5 interface).

Hereinafter the term "link quality" may be used to refer to the quality of a link to the UE. It is typically based on measured signal strength. Uu link quality refers to the quality of the link between the UE and the serving cell's gNB. PC5 link quality refers to the quality of the link between the UE and the Relay UE.

Embodiments Set 1

1. A first device (remote UE) that is configured to execute the instructions of
   a. Receiving information from the second device via Uu interface
   b. Receiving information from the third device via PC5 interface
   c. Selecting a serving cell to provide available services and monitors its control channel based on received information.
2. The second device of embodiment 1 is a gNB and the third device of embodiment 1 is a Relay UE.
3. The first device of embodiment 1, wherein the device first attempts to select a suitable cell. If no suitable cell is found, the device discovers and selects a third device and selects the serving cell of the third device as the serving cell.
4. The third device of embodiment 3, wherein fulfilling following conditions
   The third device is a UE-to-NW Relay
   The traffic load of the third device is below a configured threshold
   The serving cell of the third device is part of either the selected PLMN or the registered PLMN or PLMN of the Equivalent PLMN list of the first device.
   The PC5 link quality exceeds a configured threshold.
   The serving cell of the third device is not barred as the serving cell of the first device.
   The serving cell of the third device is part of at least one TA that is not part of the list of "Forbidden Tracking Areas", which belongs to a PLMN of the first device that fulfils the first bullet above.
5. The first device of embodiment 1, wherein the device first attempts to select a suitable cell via Uu and a suitable relay via PC5 which has the strongest signal.
6. The first device of embodiment 1, wherein the device reselects a new serving cell while it has selected a serving cell via the second device.
7. The first device of embodiment 6, wherein receiving configuration from the third device about frequency priority, measurements criteria and reselection criteria.
8. The first device of embodiment 6, reselect the new serving cell based on frequency priority, Uu and PC5 link quality and accessibility criteria.
9. The first device of embodiment 1, wherein the device reselects a new serving cell while it has selected a serving via Uu interface with the third device.

10. The first device of embodiment 9, wherein receiving configuration from the third device about relay discovery, relay selection and reselection criteria.

11. The first device of embodiment 9, wherein reselecting the new serving cell based Uu and PC5 link quality and accessibility criteria.

12. The first device of embodiment 1, wherein selecting a path to receive paging message from the second device based on information received from the second device and the third device.

13. The first device of embodiment 12, wherein initiating a paging path selection using information provided by the second device.

14. The first device of embodiment 13, wherein receiving system information from the second device including the criteria to select its paging path.

15. The first device of embodiment 13, wherein deciding paging path based on the comparison of its Uu link quality between the second device and PC5 link quality between the third device.

16. The first device of embodiment 13, wherein sending a paging path selection request to the third device to inform its paging parameters or stop monitoring and forwarding paging messages.

17. The first device of embodiment 13, wherein sending a paging path selection request to the second device to inform its paging selection decision.

18. The third device of embodiment 12, wherein initiating a paging path selection using information provided by the second device.

19. The third device of embodiment 18, wherein receiving system information from the second device including the criteria to decide whether to forward paging message to the first device.

20. The first device of embodiment 18, wherein initiating a paging path selection using information provided by the second device.

21. The first device of embodiment 1, wherein choosing a path to establish RRC connection to the second device based on information received from the second device and the third device.

22. The first device of embodiment 21, wherein determining a RRC connection based on the information provided by the second device and the third device.

23. The first device of embodiment 22, wherein selects a direct path or indirect path based on QoS of the traffic, link quality between the second device, link quality between the third device and traffic load, uplink rate and downlink rate of the third device.

24. The first device of embodiment 22, wherein receiving a RACH response message from the second device indicating the path to use to establish RRC connection.

25. The first device of embodiment 22, where receiving a paging message from the second device indicating the path to use to establish RRC connection.

26. The first device of embodiment 22, where receiving a paging message from the third device indicating the path to use to establish RRC connection.

Embodiment Set 2

100. A first device (remote UE) that is configured to execute the instructions of
a. Receiving information from the third device via PC5 interface b. Selecting a serving cell to provide available services and monitors its control channel based on received information.

101. The first device of embodiment 1, wherein the device first attempts to select a suitable cell. If no suitable cell is found, the device discovers and selects a third device and selects the serving cell of the third device as the serving cell.

102. The third device of embodiment 3, wherein fulfilling following conditions
The third device is a UE-to-NW Relay
The traffic load of the third device is below a configured threshold
The serving cell of the third device is part of either the selected PLMN or the registered PLMN or PLMN of the Equivalent PLMN list of the first device.
The PC5 link quality exceeds a configured threshold.
The serving cell of the third device is not barred as the serving cell of the first device.
The serving cell of the third device is part of at least one TA that is not part of the list of "Forbidden Tracking Areas", which belongs to a PLMN of the first device that fulfils the first bullet above.

103. The first device of embodiment 1, wherein the device first attempts to select a suitable cell via Uu and a suitable relay via PC5 which has the strongest signal.

104. The first device of embodiment 6, wherein receiving configuration from the third device about frequency priority, measurements criteria and reselection criteria.

105. The first device of embodiment 6, reselect the new serving cell based on frequency priority, Uu and PC5 link quality and accessibility criteria.

106. The first device of embodiment 1, wherein the device reselects a new serving cell while it has selected a serving via Uu interface with the third device.

107. The first device of embodiment 9, wherein receiving configuration from the third device about relay discovery, relay selection and reselection criteria.

108. The first device of embodiment 9, wherein reselecting the new serving cell based Uu and PC5 link quality and accessibility criteria.

109. The first device of embodiment 100, wherein the first device receives information from a second device via Uu interface.

110. The second device of embodiment 109, wherein the second device is a base station.

111. The first device of embodiment 109, wherein the information received from the second device is a configuration information.

112. The first device of embodiment 109, wherein the device reselects a new serving cell while camping on a serving cell it has selected via the second device over Uu interface.

113. The first device of embodiment 109, wherein the first device selects a path to receive paging message from the second device or to exchange RRC connection establishment message with the second device based on information received from the second device or the third device.

114. The first device of embodiment 113, wherein the first device selects a path for paging reception or for the exchange of RRC connection establishment messages using information provided by the second device.

115. The first device of embodiment 113, wherein the first device receives system information from the second device or the third device, wherein the received system information includes the criteria to select its paging path.

116. The first device of embodiment 113, wherein the first device decides the path for paging reception or for the exchange of RRC connection establishment messages based on the comparison of the quality of its Uu link with the second device and the quality of it PC5 link to the third device.

117. The first device of embodiment 113, wherein the first device decides the path for paging reception or for the exchange of RRC connection establishment messages based on the comparison of the quality of its Uu link with the second device and the composite quality of it PC5 link to the third device and the Uu link between the third device and the second device.

118. The first device of embodiment 113, wherein the first device signals to the second device, its path selection for paging message reception or for the exchange of RRC connection establishment messages.

119. The first device of embodiment 113, wherein the first device signals to the third device, its paging reception parameters, or its parameters for the reception of RRC connection messages.

120. The first device of embodiment 113, wherein the first device signals to the third device, to stop paging reception, or the forwarding of paging message or both.

121. The third device of embodiment 113, wherein the third device receives paging message based on the paging reception parameters received from the first device.

122. The third device of embodiment 113, wherein the third device receives paging message based on the paging reception parameters received from the second device.

123. The third device of embodiment 122, wherein the third device receives system information from the second device including the criteria to decide whether to forward paging message to the first device.

124. The first device of embodiment 109, wherein the first device selects a direct path or an indirect to establish RRC connection to the second device based on information received from the second device or the third device.

125. The first device of embodiment 124, wherein the first device performs RRC connection based on the information provided by the second device and the third device.

126. The first device of embodiment 124, wherein the first device select a direct path or an indirect path based on QoS of the traffic, link quality between the second device, link quality between the third device and traffic load, uplink rate and downlink rate of the third device.

127. The first device of embodiment 124, wherein the first device receives a RACH response message from the second device indicating the path to use to establish RRC connection.

128. The first device of embodiment 124, wherein the first device receives a paging message from the second device indicating the path to use to establish RRC connection.

129. The first device of embodiment 124, where the first device receives a paging message from the third device indicating the path to use to establish RRC connection.

Methods are proposed to consider the impact of coverage through PC5 interface when a remote UE is doing the cell (re)selection. In accordance with one example method, a remote UE may select a serving cell considering the impact of coverage through PC5 interface. The remote UE can select a serving cell using the Uu interface or select a serving cell using PC5 interface via a UE-to-NW Relay.

Cell selection may be performed by prioritizing Uu interface as follows:

Initial cell selection (no prior knowledge of which RF channels are NR frequencies):

The UE may scan all RF channels in the NR bands according to its capabilities to find a suitable cell using Uu interface.

On each frequency, the UE needs only search for the strongest cell via Uu, except for operation with shared spectrum channel access where the UE may search for the next strongest cell(s).

Once a suitable cell via Uu is found, this cell may be selected.

If no suitable cell via Uu is found, the UE may perform a Sidelink discovery and discovers all Relay UEs. Among all discovered Relay UEs, the UE may select a suitable relay UE and select the serving cell of that relay UE to camp on. Of all the discovered Relay UEs that are suitable, the UE may select the strongest in terms of signal strength (for example the signal strength may be in terms of PSSCH-RSRP, PSCCH-RSRP, PSBCH-RSRP, SD-RSRP, Sidelink RSSI, or any similar sidelink measurements) or the UE may select the first sidelink Relay UE with received signal strength above a threshold.

Alternatively, if no suitable cell via Uu is found, the UE does a Sidelink discovery and for each discovered relay UE, the UE checks if the relay UE is suitable. If UE determines that the discovered relay UE is not suitable it moves to the next discovered relay UE.

A Relay UE may be considered as suitable if, for example, the following conditions are fulfilled:

The Relay UE is a UE-to-NW Relay;

The Relay UE is a UE-to-UE relay that has a communication path to a gNB;

The traffic load of the Relay UE is below configured threshold (pre-configured or provided by the gNB);

The serving cell of the Relay UE is part of either the selected PLMN or the registered PLMN or PLMN of the Equivalent PLMN list of the remote UE;

The PC5 link quality exceeds configured threshold (pre-configured or provided by the gNB; the link quality may be in terms of PSSCH-RSRP, PSCCH-RSRP, PSBCH-RSRP, SD-RSRP, Sidelink RSSI, or any similar sidelink measurements);

The Uu link quality of the relay UE exceeds configured threshold;

The serving cell of the Relay UE is not barred for the remote UE; and

The serving cell of the Relay UE is part of at least one TA that is not part of the list of "Forbidden Tracking Areas", which belongs to a PLMN of the remote UE that fulfils the condition that the Relay UE is a UE-to-NW Relay.

Cell selection by leveraging stored information is described herein. This procedure requires stored information of frequencies and also information on cell parameters from previously received measurement control information elements or from previously detected cells.

Once the UE has found a suitable cell, the UE may select it.

If no suitable cell is found, the initial cell selection procedure for initial cell selection, described above, may be started.

In a second proposed method, cell selection may be performed without prioritizing Uu interface as follows:

Initial cell selection (no prior knowledge of which RF channels are NR frequencies):

The UE may scan all RF channels in the NR bands according to its capabilities to find a suitable cell using Uu interface and a suitable Relay UE via PC5 interface.

On each frequency; the UE needs only search for the strongest signal via Uu and the strongest relay UE via PC5, except for operation with shared spectrum channel access where the UE may search for the next strongest cell(s). In searching for the strongest relay UE, the UE may perform discovery to determine the relay UEs on the frequency.

Once a suitable cell via Uu or via a suitable relay UE on PC5 is found; this cell may be selected. A suitable cell via a suitable relay UE on PC5 is considered as suitable if, for example, the following conditions are fulfilled:

The Relay UE is a UE-to-NW Relay;

The Relay UE is a UE-to-UE relay that has a communication path to a gNB;

The traffic load of the Relay UE is below configured threshold (pre-configured or provided by the gNB; the link quality may be in terms of PSSCH-RSRP, PSCCH-RSRP, PSBCH-RSRP, SD-RSRP, Sidelink RSSI, or any similar sidelink measurements);

The Uu link quality of the relay UE exceeds a configured threshold;

The serving cell of the Relay UE is part of either the selected PLMN or the registered PLMN or PLMN of the Equivalent PLMN list of the remote UE;

The PC5 link quality exceeds configured threshold (pre-configured or provided by the gNB);

The serving cell of the Relay UE is not barred for the remote UE; and

The serving cell of the Relay UE is part of at least one TA that is not part of the list of "Forbidden Tracking Areas", which belongs to a PLMN of the remote UE that fulfils the condition that the Relay UE is a UE-to-NW Relay.

On each frequency, the UE may choose to search for the strongest cell first, or the strongest relay UE first, or it may have some rule to choose one over the other. For example, if power is an issue, the UE may choose to look for the strongest relay UE first. Alternatively, the UE may alternate between strongest cell or strongest relay UE. As another alternative, the UE may look for strongest relay UE first on frequencies known to support the PC5 interface, or UE may look for strongest cell first on frequencies for which UE does not know whether the frequency supports the PC5 interface or for which UE knows that frequency does not support the PC5 interface.

Cell selection by leveraging stored information is described herein. This procedure requires stored information of frequencies and optionally also information on cell parameters from previously received measurement control information elements or from previously detected cells. Once the UE has found a suitable cell, the UE may select it. If no suitable cell is found, the initial cell selection procedures described above may be started.

In another method described herein, cell selection may be performed by prioritizing PC5 interface as follows:

Initial cell selection (no prior knowledge of which RF channels are NR frequencies):

The UE may scan all RF channels in the NR bands for which it knows that the frequency supports the PC5 interface.

On each frequency, the UE may perform a Sidelink discovery and for each discovered relay UE, the UE may check if the relay UE is suitable. If UE determines that the discovered relay UE is not suitable it moves to the next discovered relay UE.

A Relay UE is considered as suitable if, for example, the following conditions are fulfilled:

The Relay UE is a UE-to-NW Relay;

The Relay UE is a UE-to-UE relay that has a communication path to a gNB;

The traffic load of the Relay UE is below configured threshold (pre-configured or provided by the gNB);

The serving cell of the Relay UE is part of either the selected PLMN or the registered PLMN or PLMN of the Equivalent PLMN list of the remote UE;

The PC5 link quality exceeds configured threshold (pre-configured or provided by the gNB; the link quality may be in terms of PSSCH-RSRP, PSCCH-RSRP, PSBCH-RSRP, SD-RSRP, Sidelink RSSI, or any similar sidelink measurements);

The Uu link quality of the relay UE exceeds configured threshold;

The serving cell of the Relay UE is not barred for the remote UE;

The serving cell of the Relay UE is part of at least one TA that is not part of the list of "Forbidden Tracking Areas", which belongs to a PLMN of the remote UE that fulfils the first condition above;

If no suitable relay is found, the UE may scan all RF channels in the NR bands according to its capabilities to find a suitable cell using Uu interface.

On each frequency, the UE needs only search for the strongest cell via Uu, except for operation with shared spectrum channel access where the UE may search for the next strongest cell(s).

Cell selection by leveraging stored information:

This procedure uses stored information of frequencies and may also use information on cell parameters from previously received measurement control information elements or from previously detected cells.

Once the UE has found a suitable cell, the UE may select it.

If no suitable cell is found, the initial cell selection procedure above may be started.

In order to reduce the cell selection times, the UE may prioritize certain frequencies during the cell selection search. A frequency may support the PC5 interface (be used for sidelink communication), a frequency may support a Uu interface (frequency may be an NR frequency), or a frequency may support both a PC5 and Uu interface. During initial cell selection, a UE may or may not know whether a frequency supports the PC5 interface and/or the Uu interface. Each frequency may be assigned a priority based on whether the UE knows whether the frequency supports the PC5 interface and/or the Uu interface, as well as if the frequency supports one or both of the interfaces. The UE may then search these frequencies in order of priority.

For example, the UE may search frequencies according to the following priority:

Frequencies that are known support both Uu and PC5 interfaces;

Frequencies that are known to support PC5 interface, but for which the UE has no knowledge of whether a frequency supports the Uu interface;

Frequencies that are known to support Uu interface, but for which the UE has no knowledge of whether a frequency supports the PC5 interface;

Frequencies for which the UE has no knowledge of whether a frequency supports PC5 interface or Uu interface.

Note that in the above description, it is assumed that the Relay UE provides the necessary information to the remote UE for cell selection, the information provided in Discovery messages. For example, the Discovery message may include: the PLMN of relay UE serving cell, the access barring status of serving cell of relay UE, the TAs of serving cell of relay UE, radio quality if Uu link, etc.

Methods are proposed for a remote UE to reselect a serving cell considering the impact of coverage through PC5 interface when the remote UE and the Relay UE are in coverage of different cells. The procedure covers the following cell reselection cases: Uu coverage cell 1 to PC5 coverage cell 2, PC5 coverage cell 1 to Uu coverage cell 2, and PC5 coverage cell 1 to PC5 coverage cell 2.

Figure 6:
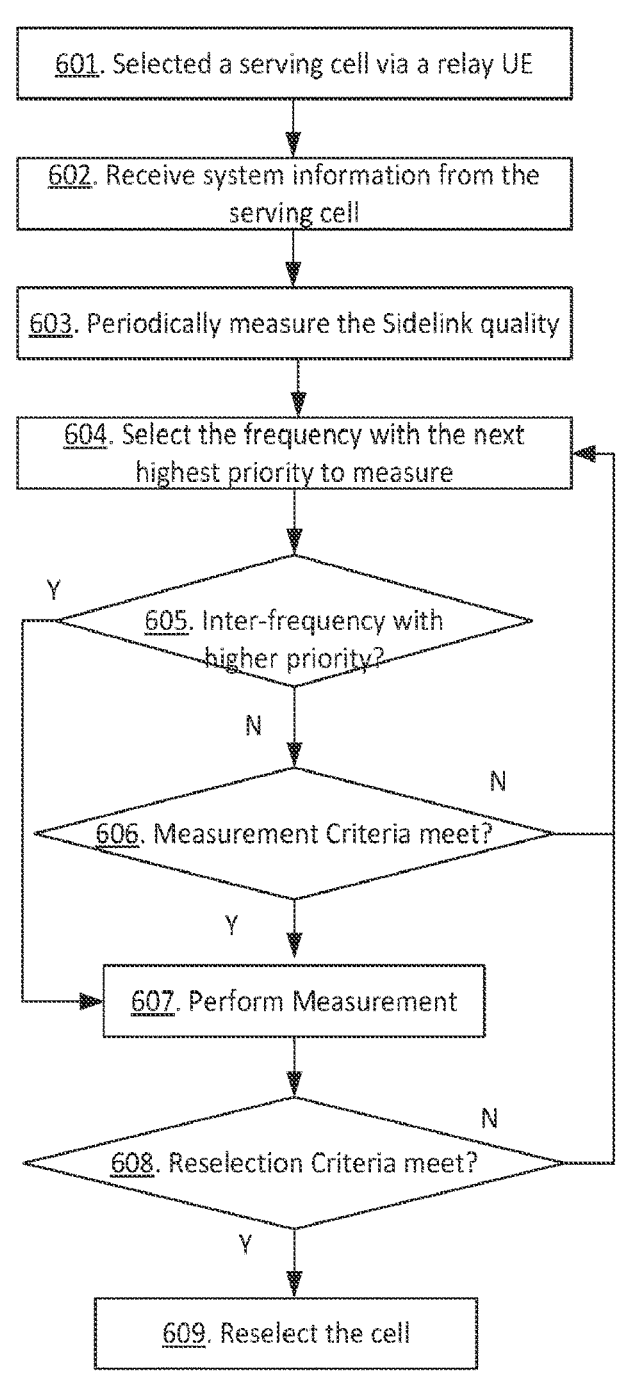
FIG. 6 shows an example of serving cell reselection considering the impact of coverage through PC5 interface when the remote UE and the Relay UE are in coverage of different cells and the remote UE has selected a serving cell via a Relay UE.

FIG. 6 shows an example of serving cell reselection 500. In this example, a remote UE may detect and may reselect a cell via Uu while it has selected a serving cell via a relay UE. At step 601, the remote UE may discover a relay UE and may select the serving cell via a relay UE. At step 602, the remote UE may receive system information from the serving cell. The system information may comprise cell reselection priorities for different NR frequencies for the remote UE. The system information may be forwarded by the relay UE. At step 603, the remote UE may periodically measure the sidelink quality between it and the relay UE, e.g., RSRP_relay, RSRQ_relay. To assist the remote UE, the relay UE may regularly make sidelink transmissions to allow the remote UE to assess the sidelink quality. These sidelink transmissions may include discovery messages, broadcast messages, keep alive signal messages, transmissions to other peer UEs. These transmissions may be periodic, or event triggered. For example, the relay UE may send these messages when greater than K (K>=1) remote UEs are using the Relay UE as a UE-to-Network Relay. As another example, the relay UE may send these messages when there is a request from the remote UE. At step 604, based on the store cell reselection priority information, the remote UE may select the frequency with the highest priority that it has to measure.

At step 605, if the selected frequency is an inter-frequency with priority that is higher than the current frequency of the remote UE, the remote UE may measure the selected frequency in step 607. Otherwise, it goes to 606. At step 606, the remote UE may decide whether to measure the selected frequency. If the measurement criteria are not met, the remote UE may return to step 604. If the selected frequency is an intra-frequency, the remote UE may perform the measurement in step 607 when the sidelink quality to its relay UE is lower than or equal to a threshold, S Jelay_intrasearch. If the selected frequency is an inter-frequency, the remote UE may perform the measurement in step 607 when the sidelink quality to its relay UE is lower than or equal to a threshold, S Jelay_intersearch. At step 607, the remote UE may perform measurement(s) on the selected frequency via the Uu or PC5 interface and obtain the RSRP_n, RSRQ_n, and RSRP_q during a configured period. For the PC5 interface, the UE may first determine the nearby relay UEs. The remote UE may determine this through discovery signaling. Alternatively, the serving cell may provide relay UE information to the remote UE via system information.

At step 608, the remote UE may check whether the signal quality of the new selected frequency meets the reselection criteria. If the reselection criteria are not met, the remote UE may return to step 604. If the selected frequency is an intra-frequency, the remote UE may select the cell if $RSRP\_n>RSRP\_relay+T\_intra\_P$ and/or $RSRQ\_n>RSRQ\_relay+T\_intra\_Q$. If the selected frequency is an inter-frequency with higher priority, the remote UE selects the cell if $RSRPn>RSRP\_relay+T\_inter\_High\_P$ and/or $RSRQ\_n>RSRQ\_relay+T\_inter\_High\_Q$. If the selected frequency is an inter-frequency with equal or lower priority, the remote UE may select the cell if $RSRP\_n>RSRP\_relay+T\_inter\_low\_P$ and/or $RSRQ\_n>RSRQ\_relay+T\_inter\_low\ Q$. At step 609, the remote UE may select the new serving cell if it meets cell accessibility requirement.

As an alternative to steps 603-606 where the UE looks for a better cell if not satisfied with the current cell, it is proposed that a UE may be configured to always prioritize the Uu interface. In such a case, when serving cell selected via a PC5 interface, the UE may always take measurements trying to find a suitable cell (using the Uu interface).

Figure 7:
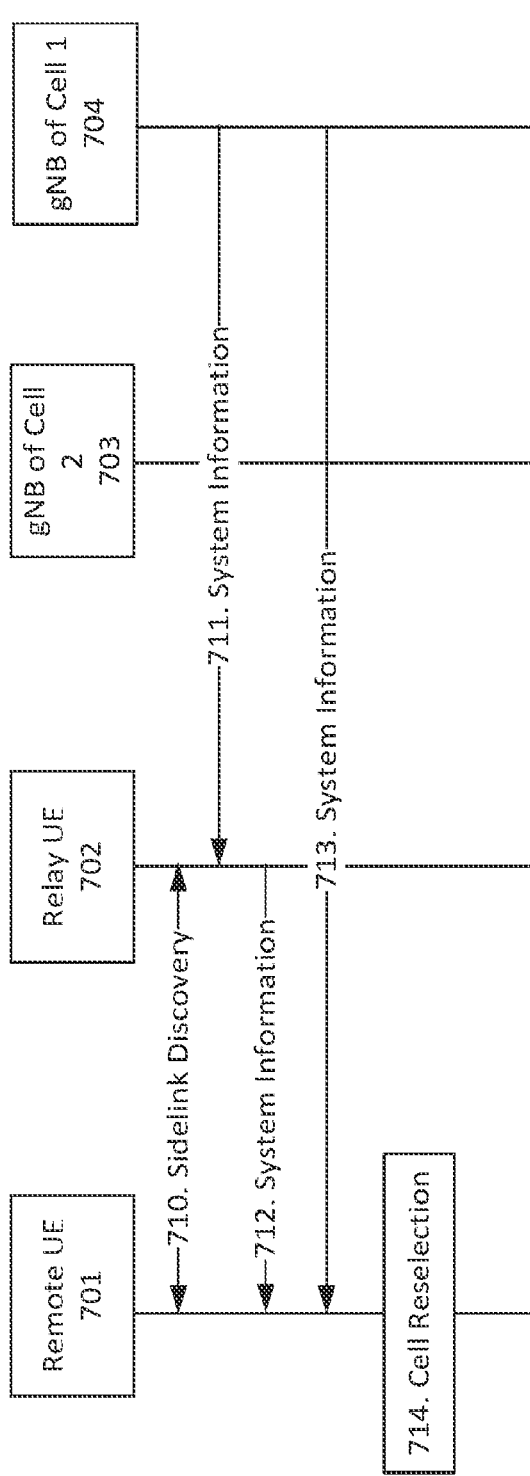
FIG. 7 shows an example message exchange between remote UE, relay UE, gNB of Cell 2 and gNB of cell 1 for Serving Cell reselection when the remote UE has selected a serving cell via a Relay UE.

FIG. 7 shows an example call flow for a message exchange 700. The message exchange in the example of FIG. 7 is between a remote UE 701, a relay UE 702, a gNB of cell 2 703, and a gNB of cell 1 704 for a serving cell reselection when the remote UE has selected a serving cell via a relay UE. At step 710, remote UE 701 and relay UE 702 may perform sidelink discovery. At step 711, the gNB of cell 1 704 may send system information to relay UE 702. At step 712, the relay UE 702 may send the system information to the remote UE 701. At step 713, the gNB of cell 1 704 may send the system information to relay UE 701. At step 714, the remote UE 701 may perform the cell reselection.

Figure 8:
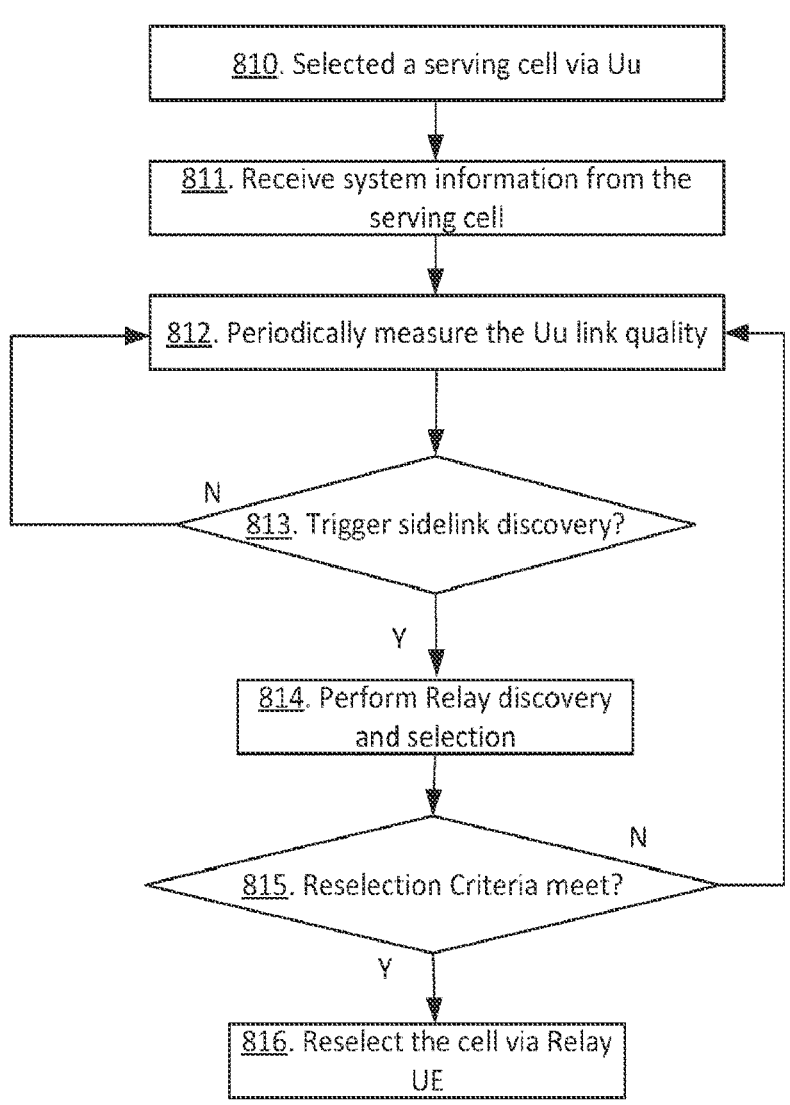
FIG. 8 shows an example of Serving Cell Reselection considering the impact of coverage through PC5 interface when the remote UE and the Relay UE are in coverage of different cells and the remote UE has selected a serving cell via Uu.

FIG. 8 shows an example method for a remote UE to detect and reselect to a cell via a relay UE while it has selected a serving cell via the Uu interface 800. At step 810, the remote UE may select a serving cell, e.g., cell 2 via the Uu interface. At step 811, the remote UE may receive system information from cell 2 indicating thresholds, e.g., T_a, T_b and T_c for the remote UE to do relay selection and cell reselection. This may also include discovery configuration information. At step 812, the remote UE periodically may measure the Uu link quality RSRP_Uu and/or RSRQ_Uu. At step 813, based on the Uu link quality, the remote UE may decide whether to trigger sidelink discovery. For example, sidelink discovery may be triggered if the Uu RSRP, e.g., the RSRP_Uu, is smaller than a threshold (T_dis_p), and the remote UE may start a relay discovery procedure. In another example, sidelink discovery may be triggered if the Uu RSRQ, e.g., RSRQ_Uu, is smaller than a threshold (T_dis_q), and the remote UE may start a relay discovery procedure.

At step 814, the remote UE may discover one or more relay UEs. During the discovery phase, the remote UE may measure the RSRP to the discovered relay UE, e.g., RSRP_relay, if the value is higher than a threshold (T_b), the remote UE may select the relay UE and establish sidelink communication. During the discovery phase, the relay UE may provide its PLMN ID and RSRP of its Uu interface RSRP_relay_Uu to the remote UE. Based on obtained information, the remote UE may identify a suitable relay UE. A relay UE may be considered as suitable if the following conditions are fulfilled:

The relay UE is a UE-to-NW relay;
The Relay UE is a UE-to-UE relay that has a communication path to a gNB
The serving cell of the relay UE is part of either the selected PLMN, the registered PLMN, or the PLMN of the Equivalent PLMN list of the remote UE;

The PC5 link quality exceeds configured threshold (pre-configured or provided by the gNB);

The serving cell of the Relay UE is not barred for the remote UE;

The Uu link quality of the relay UE exceeds configured threshold;

The relay UE load is below a configured threshold; and

The serving cell of the Relay UE is part of at least one TA that is not part of the list of "Forbidden Tracking Areas", which belongs to a PLMN of the remote UE that fulfils that the Relay UE is a UE-to-NW Relay.

At step 815, the remote UE may check the cell reselection criteria based on the RSRP_Uu, RSRP_relay and RSRP_relay_Uu. For example, if the RSRP_relay>RSRP_Uu+T_c, the remote UE may reselect the serving cell via the relay UE. In another example, if RSRP_relay_Uu>RSRP_Uu+T_c, the remote UE may reselect the serving cell via the relay UE. In yet another example, if the RSRP_relay>RSRP_Uu+T_c1 and RSRP_relay_Uu>RSRP_Uu+T_c2, the remote UE may reselect cell 1 as its serving cell. At step 816, the relay UE may select the serving cell and may receive system information forwarded by the relay UE.

As an alternative to step 813, the UE may be configured to always perform sidelink discovery to look for a Relay UE, or it may perform relay discovery based on certain rules. For example, when power is an issue, the UE may decide to look for relay UE to establish an indirect path to a gNB.

As an alternative to step 815, the UE may also include other metrics in order to determine if the cell reselection criteria are met. For example, the remote UE may include the load on the sidelink channel, the load at the relay UE, etc. The load on the sidelink channel may be based on the Channel Busy Ratio (CBR) and/or Channel Occupancy Ratio (CR). For example, cell reselection through a relay UE may only occur if CBR is below a configured threshold. The load on the relay UE may be in terms of number of active sidelink communications or the number of remote UEs for which the relay UE is acting as a UE-to-network relay. For example, cell reselection through a relay UE may only occur if Relay UE is only serving less than a threshold number of remote UEs.

Figure 9:
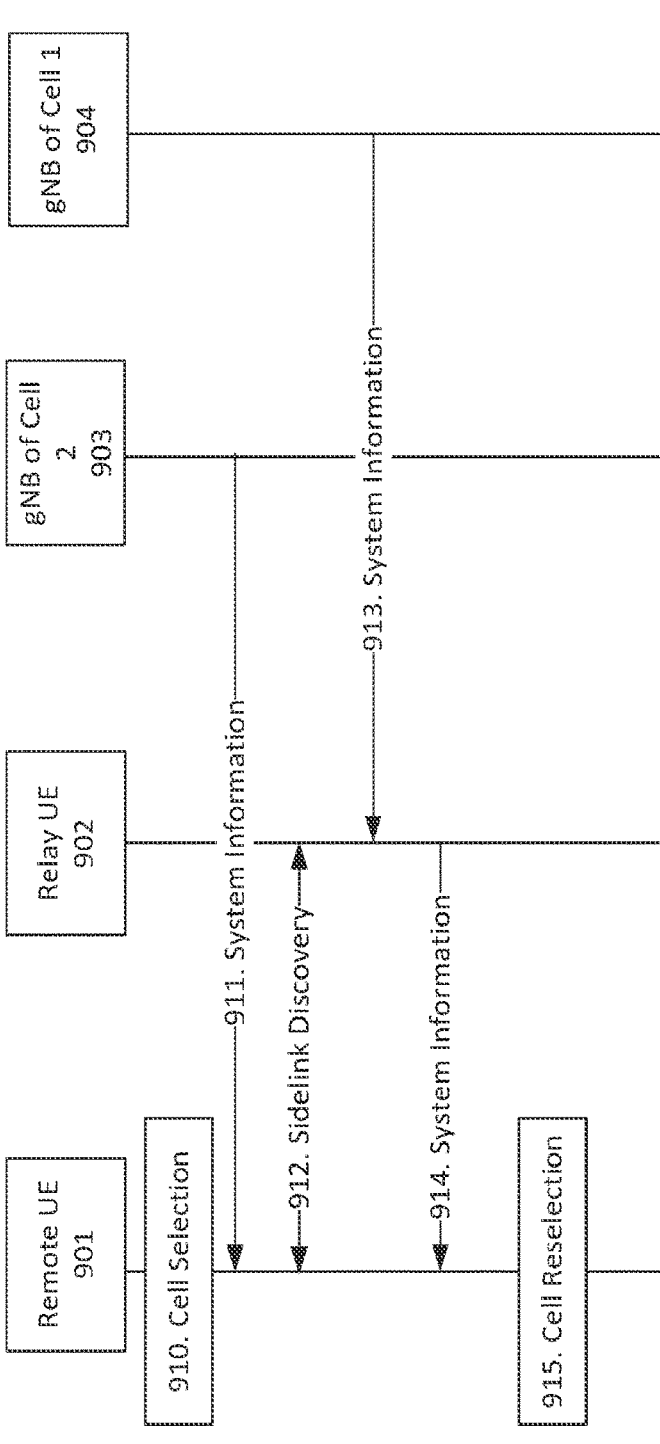
FIG. 9 shows an example message exchange between remote UE, relay UE, gNB of Cell 2 and gNB of cell 1 for Serving Cell reselection when the remote UE has selected a serving cell via Uu.

FIG. 9 shows an example call flow for a message exchange 900. The message exchange in the example of FIG. 9 is between remote UE 901, relay UE 902, gNB of cell 2 903, and gNB of cell 1 904 for serving cell reselection when the remote UE has selected a serving cell via Uu. At step 910, the remote UE 901 may (re)selects the serving cell. At step 911, the remote UE 901 may receive system information from the gNB of cell 2 903. At step 912, the remote UE 901 and the relay UE 902 may perform sidelink discovery. At step 913, the relay UE 902 may receive system information from the gNB of cell 1 904. At step 914, the remote UE 901 may receive the system information from the relay UE 902. At step 915, the remote UE 901 may perform cell reselection. The UE may monitor paging from the serving cell. In use case 1 described herein, a UE may receive paging message both from the direct path and in-direct path.

Figure 10:
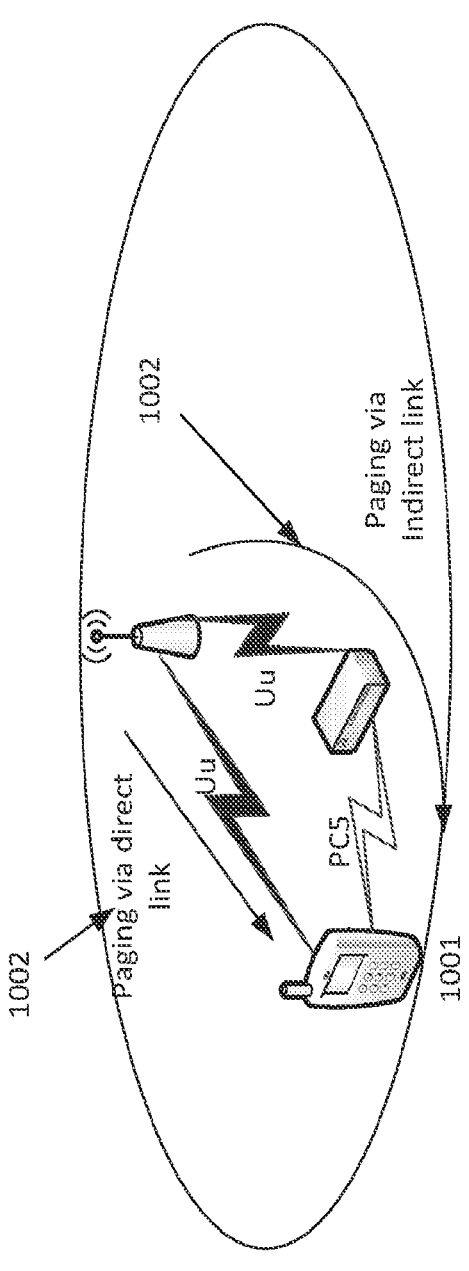
FIG. 10 shows an example of System Information and Paging Path (Re)Selection.

FIG. 10 shows an example system 1000. In the example of FIG. 10, the remote UE 1001 is in coverage of the serving cell through the Uu interface 1002 and the PC5 interface 1003. Methods are proposed to (re)select a path for paging reception in the case where the remote UE 1001 is in coverage of the serving cell through the Uu interface 1002 and the PC5 interface 1003.

Methods are described herein for a remote UE to initiate a paging path selection assisted by the information provided by the network.

Figure 11:
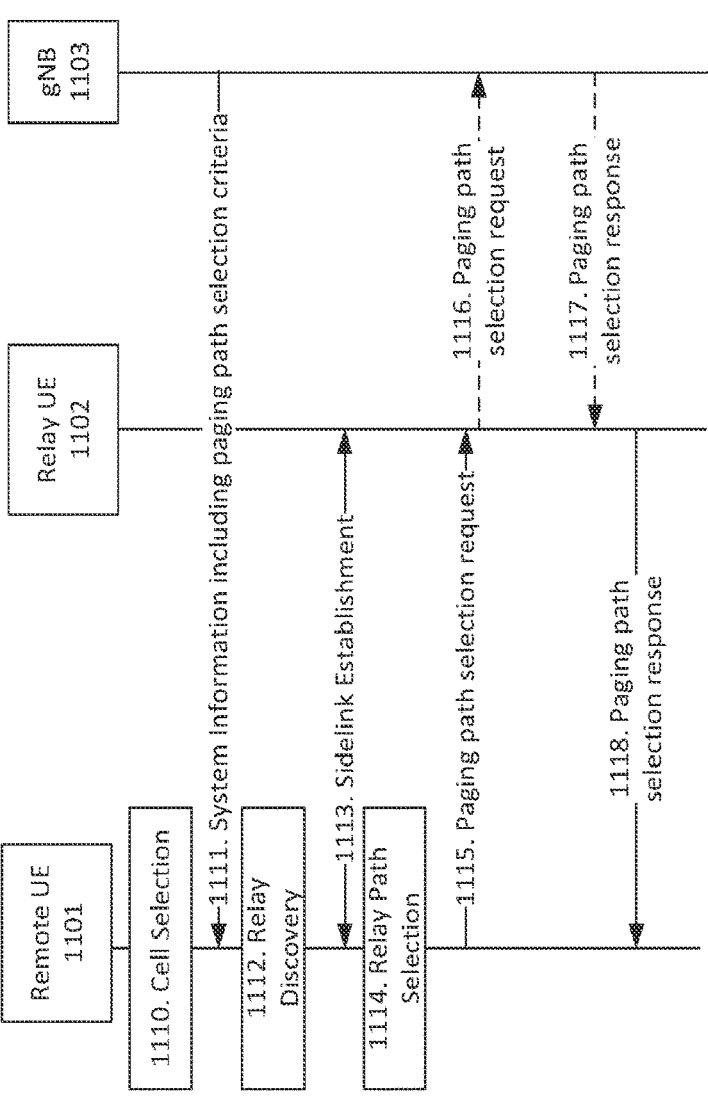
FIG. 11 shows an example of a remote UE that initiates paging path selection via a selected Relay UE.

FIG. 11 shows an example method in which a remote UE initiates paging path selection via a selected a relay UE 1100. At step 1110, a remote UE 1101 may select to camp on a cell. At step 1111, the remote UE 1101 may receive system information from the gNB 1103. The system information may comprise the criteria for the remote UE 1101 to select its paging path. The gNB 1103 can indicate a threshold T_dis that the remote UE may start discovering a relay UE when the RSRP and/or RSRQ of the Uu interface is below T_dis. The gNB 1103 can indicate a threshold T_p_Uu that the remote UE 1101 may use an indirect path to receive paging when the RSRP and/or RSRQ of the Uu interface is below T_p_Uu. The gNB 1103 can indicate a threshold T_p_relay that the remote UE 1101 may use an indirect path to receive paging when the RSRP and/or RSRQ of the Uu interface is smaller than the PC5 interface by T_p_relay.

At step 1112, the remote UE 1101 may start discovering relay UEs when the RSRP and/or RSRQ of the Uu interface is below T_dis. The remote UE 1101 may select a relay UE 1102 to establish PC5-RRC connection.

At step 1113, the remote UE 1101 may establish sidelink communication via a PC5-RRC connection with the selected relay UE 1102.

At step 1114, the remote UE 1101 may make a paging path (re)selection decision based on criteria provided in the system information based RSRP and/or RSRQ of the Uu and the PC5 interface. For example, the remote UE 1101 may use an indirect path to receive paging when the RSRP and/or RSRQ of the Uu interface is below T_p_Uu. The remote UE 1101 may use a direct path to receive paging when the sidelink measurement quantity (e.g., SL RSRP, SL RSRQ, etc.) falls below a threshold (e.g., T_indirect_sl). In another example, the remote UE 1101 may use an indirect path to receive paging when the RSRP and/or RSRQ of the Uu interface is smaller than the link quality (e.g., SL RSRP and/or SL RSRQ, etc.) on the PC5 interface by T_p_relay. In yet another example, the remote UE 1101 may use an indirect path to receive paging when the RSRP and/or RSRQ of the Uu interface is smaller than the PC5 interface by T_p_relay and when the RSRP and/or RSRQ of the Uu interface is below T_p_Uu. The remote UE 1101 may also make the paging path (re)selection decision based on the traffic load of the relay UE 1102. The remote UE 1101 may use the direct path if the traffic load of the relay UE 1102 is below a configured threshold (pre-configured or provided by the gNB).

At step 1115, in the scenario that the remote UE 1101 decides to use an indirect path to receive paging messages, it may send a paging path selection request to the relay UE 1102. In the message, the remote UE 1101 may provide the relay UE 1102 its paging parameters for the relay UE 1102 to calculate and monitor the PO on behalf of it. The paging parameters may include but are not limited to UE ID or DRX cycle. In the scenario that the remote UE 1101 decides to stop using the indirect path to receive paging messages, it may send a paging path selection request to the relay UE 1102 notifying the relay UE 1102 to stop monitoring and forwarding paging message.

At step 1116, if the relay UE 1102 decides to monitor and forward paging messages for the remote UE 1101, and the remote UE 1101 does not provide its paging parameters, the relay UE 1102 may send a paging path selection request to the gNB 1116 to obtain paging parameters associated with the remote UE 1101.

At step 1117, the gNB 1103 may send a paging path selection response that includes paging parameters associated with the remote UE 1101.

At step 1118, the relay UE 1102 may send a paging path selection response message to the remote UE 1101 to confirm whether it will monitor and forward paging messages for the remote UE 1101. If the relay UE 1102 confirms that it will monitor and forward paging messages to the remote UE 1101, the remote UE 1101 may stop monitoring its PO from the gNB 1103. The remote UE 1101 may continue to monitor RSRP and/or RSRQ of the Uu and the PC5 interfaces and may decide whether to resume/stop monitor paging messages from the direct path and indirect path.

Figure 12:
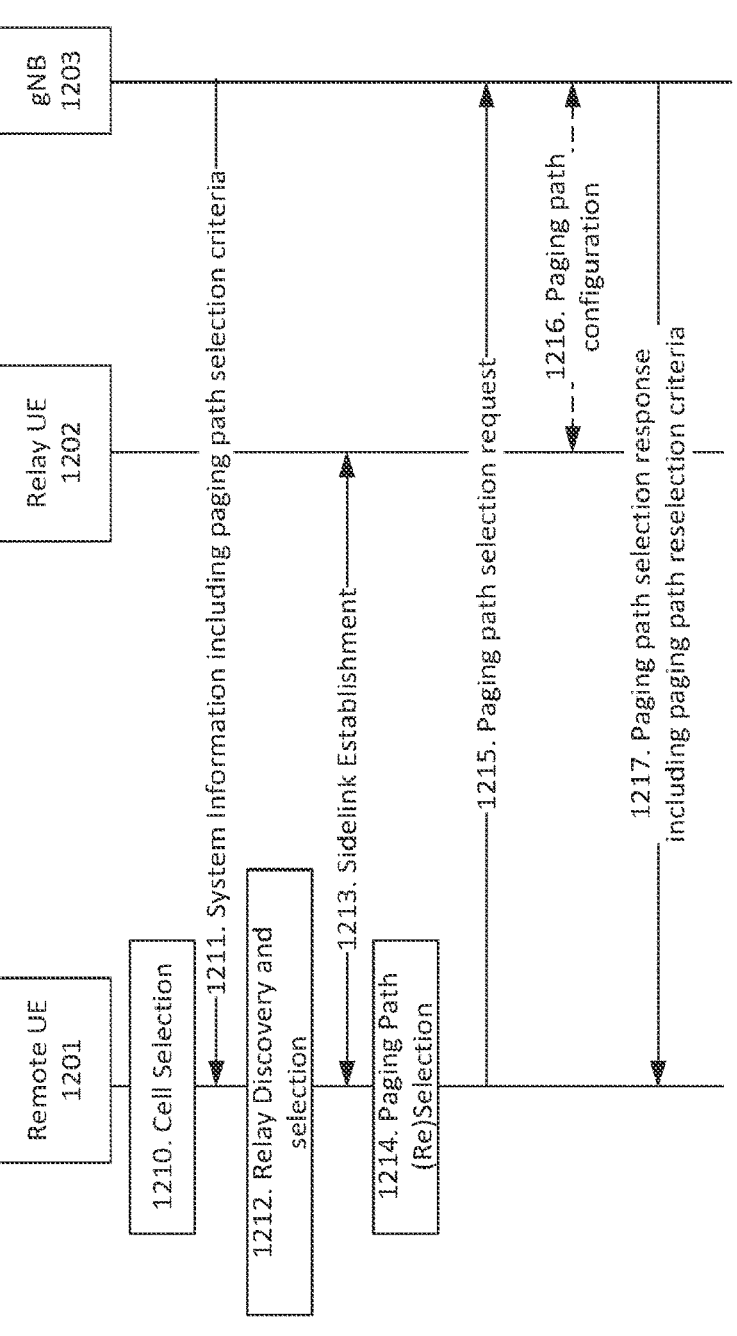
FIG. 12 shows an example of a remote UE that initiates paging path selection via Uu interface.

FIG. 12 shows an example method in which a remote UE initiates paging path selection via its Uu interface 1200. At step 1210, a remote UE 1201 may select to camp on a cell. At step 1211, the remote UE 1201 may receive system information from the gNB 1203. The system information may comprise the criteria for the remote UE 1201 to select its paging path. The gNB 1203 can indicate a threshold T_dis that the remote UE may start discovering a relay UE when the RSRP and/or RSRQ of the Uu interface is below T_dis. The gNB 1203 can indicate a threshold T_p_Uu that the remote UE 1201 may use an indirect path to receive paging when the RSRP and/or RSRQ of the Uu interface is below T_p_Uu. The gNB 1203 can indicate a threshold T_p_relay that the remote UE 1201 may use an indirect path to receive paging when the RSRP and/or RSRQ of the Uu interface is smaller than the PC5 interface by T_p_relay.

At step 1212, the remote UE 1201 may start discovering relay UEs when the RSRP and/or RSRQ of the Uu interface is below T_dis. The remote UE 1201 may select a relay UE 1202 to establish PC5-RRC connection.

At step 1213, the remote UE 1201 may establish sidelink communication via a PC5-RRC connection with the selected relay UE 1202.

At step 1214, the remote UE 1201 may make a paging path (re)selection decision based on criteria provided in the system information based RSRP and/or RSRQ of the Uu and the PC5 interface. For example, the remote UE 1201 may use an indirect path to receive paging when the RSRP and/or RSRQ of the Uu interface is below T_p_Uu. The remote UE 1201 may use a direct path to receive paging when the sidelink measurement quantity (e.g., SL RSRP, SL RSRQ, etc.) falls below a threshold (e.g., T_indirect_sl). In another example, the remote UE 1201 may use an indirect path to receive paging when the RSRP and/or RSRQ of the Uu interface is smaller than the link quality (e.g., SL RSRP and/or SL RSRQ, etc.) on the PC5 interface by T_p_relay. In yet another example, the remote UE 1201 may use an indirect path to receive paging when the RSRP and/or RSRQ of the Uu interface is smaller than the PC5 interface by T_p_relay and when the RSRP and/or RSRQ of the Uu interface is below T_p_Uu. The remote UE 1201 may also make the paging path (re)selection decision based on the traffic load of the relay UE 1202. The remote UE 1201 may use the direct path if the traffic load of the relay UE 1202 is below a configured threshold (pre-configured or provided by the gNB).

At step 1215, in the scenario that the remote UE 1201 decides to use an indirect path to receive a paging message, it may send a paging path selection request to the gNB 1203. In the scenario that the remote UE 1201 decides to stop using the indirect path to receive paging messages, it may send a paging path selection request to the gNB 1203.

At step 1216, the gNB 1203 may send a paging path configuration to the relay UE 1202. If the remote UE 1201 requests to use an indirect path to receive the paging message, the message may include paging parameters associated with the remote UE 1201. If the remote UE 1201 requests to stop using an indirect path to receive the paging message, the message may indicate the remote UE ID to which the relay UE 1202 stops monitoring and forwarding paging messages.

At step 1217, the gNB may send a paging path selection response to the remote UE 1201 to confirm whether the relay UE 1202 is to monitor and forward paging messages to the remote UE 1201. If the relay UE 1202 confirms that it will not monitor and forward paging messages to the remote UE 1201, the remote UE 1201 may stop monitoring its PO from the gNB 1203. The remote UE 1201 may continue to monitor RSRP and/or RSRQ of the Uu and the PC5 interfaces and may decide whether to resume/stop monitor paging messages from the direct path and indirect path. In the message, the gNB 1203 may also include new paging path selection criteria for remote UE 1201.

Figure 13:
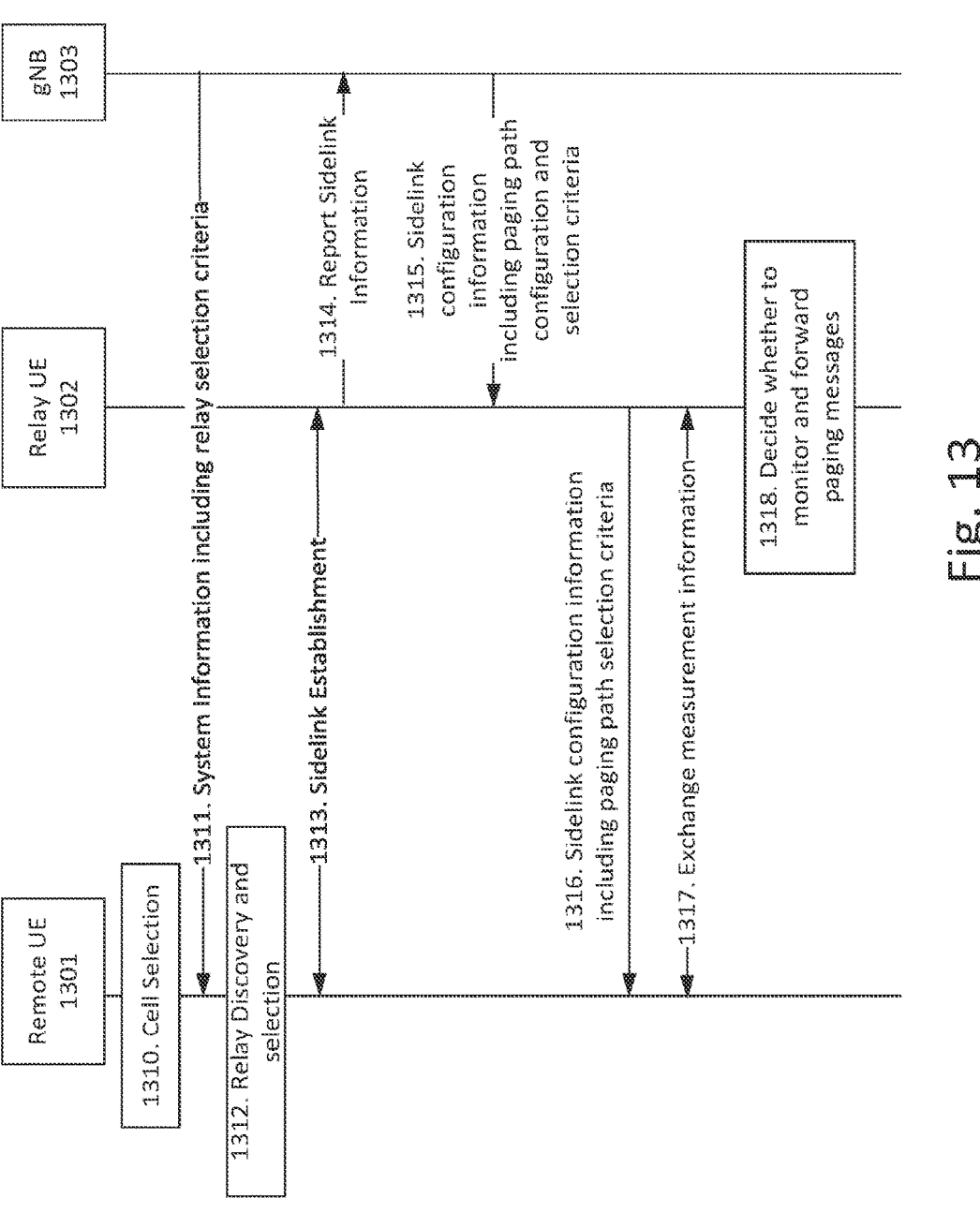
FIG. 13 shows an example of a relay UE that initiated paging path (re)selection.

FIG. 13 shows an example method for a relay UE to initiate a paging path selection using information provided by the network 1300. At step 1310, a remote UE 1301 may select to camp on a cell. At step 1311, the remote UE 1301 may receive system information from the gNB 1303. The system information may include the criteria for the remote UE 1301 to select its paging path. The gNB 1303 may indicate a threshold T_dis that the remote UE 1301 may start discovering a relay UE when the RSRP and/or RSRQ of the Uu interface is below T_dis. The gNB 1303 may indicate a threshold T_p_Uu that the remote UE 1301 may receive a paging from an indirect path when the RSRP and/or RSRQ of the Uu interface is below T_p_Uu.

At step 1312, the remote UE 1301 may start discovering relay UEs when the RSRP and/or RSRQ of the Uu interface is below T_dis. The remote UE 1301 may select a relay UE 1302 to establish a PC5-RRC connection.

At step 1313, the remote UE 1301 may establish sidelink communication via a PC5-RRC connection with the selected relay UE 1302.

At step 1314, the relay UE 1302 may send a message to report that the remote UE 1301 has established an PC5-RRC connection with the selected relay UE 1302.

At step 1315, the gNB 1303 may send a response message to the relay UE 1302 that includes paging path configuration and selection criteria for the relay UE 1302 used for monitoring and forwarding paging messages to the remote UE 1301. For example, the message may include paging parameters associated with the remote UE 1301 that the relay UE 1302 may use to monitor the PO of the remote UE 1301. The message may provide a threshold T_p_Uu that the remote UE 1301 needs to receive paging from an indirect path when the RSRP and/or RSRQ of the Uu interface is below T_p_Uu.

At step 1316, the relay UE 1302 may send a sidelink configuration information message to the remote UE 1301. In the message, the relay UE 1302 may provide the criteria for monitoring and forwarding paging messages. The relay UE 1302 also may indicate the remote UE 1301 to periodically report the RSRP and/or RSRQ of its Uu interface or report if the values change above or below T_p_Uu.

At step 1317, the relay UE 1302 and the remote UE 1302 may exchange measurement information of their Uu interfaces. For example, the remote UE 1302 may report the RSRP and/or RSRQ of its Uu interface if the value changes above or below T_p_Uu. In another example, the remote UE 1301 and the relay UE 1302 may periodically report the RSRP and/or RSRQ of its Uu interface.

At step 1318, the relay UE 1302 may decide whether to monitor and forward paging messages based on the RSRP and/or RSRQ of the remote UE's Uu interface. For example, the relay UE 1302 may stop monitoring and forwarding paging messages if the RSRP and/or RSRQ of the remote UE's 1301 Uu interface is above a threshold T_p_Uu.

Methods are described herein for a gNB to be aware of the path selection. In one example, assistance information may be provided to the gNB, so that the gNB is always aware of where to page the remote UE. It is proposed that both the remote UE and the serving cell maintain a paging path status, which designates whether the UE is camped on the serving cell through a Uu interface or over a PC5 interface. Once a UE performs a cell reselection, it may indicate to the gNB if it is camped through the PC5 interface or the Uu interface. UE may provide this indication at each cell reselection, or only when the paging path status changes (from Uu interface to PC5 interface or from PC5 interface to Uu interface). The gNB may always assume that the UE is paged through the Uu interface, unless the UE explicitly indicates otherwise. Alternatively, the gNB may assume that the UE is paged through the interface indicated in the paging path status.

After a remote UE that is in RRC_IDLE/RRC_INAC-TIVE receives a paging message for mobile terminated traffic or its upper layer initiates mobile originated traffic, the remote UE may establish an RRC connection with the gNB. However, there may be more than one direct and in-direct path between a remote UE and the gNB. Methods are described herein to determine the path(s) to establish the RRC connection between the gNB and the remote UE.

Figure 14:
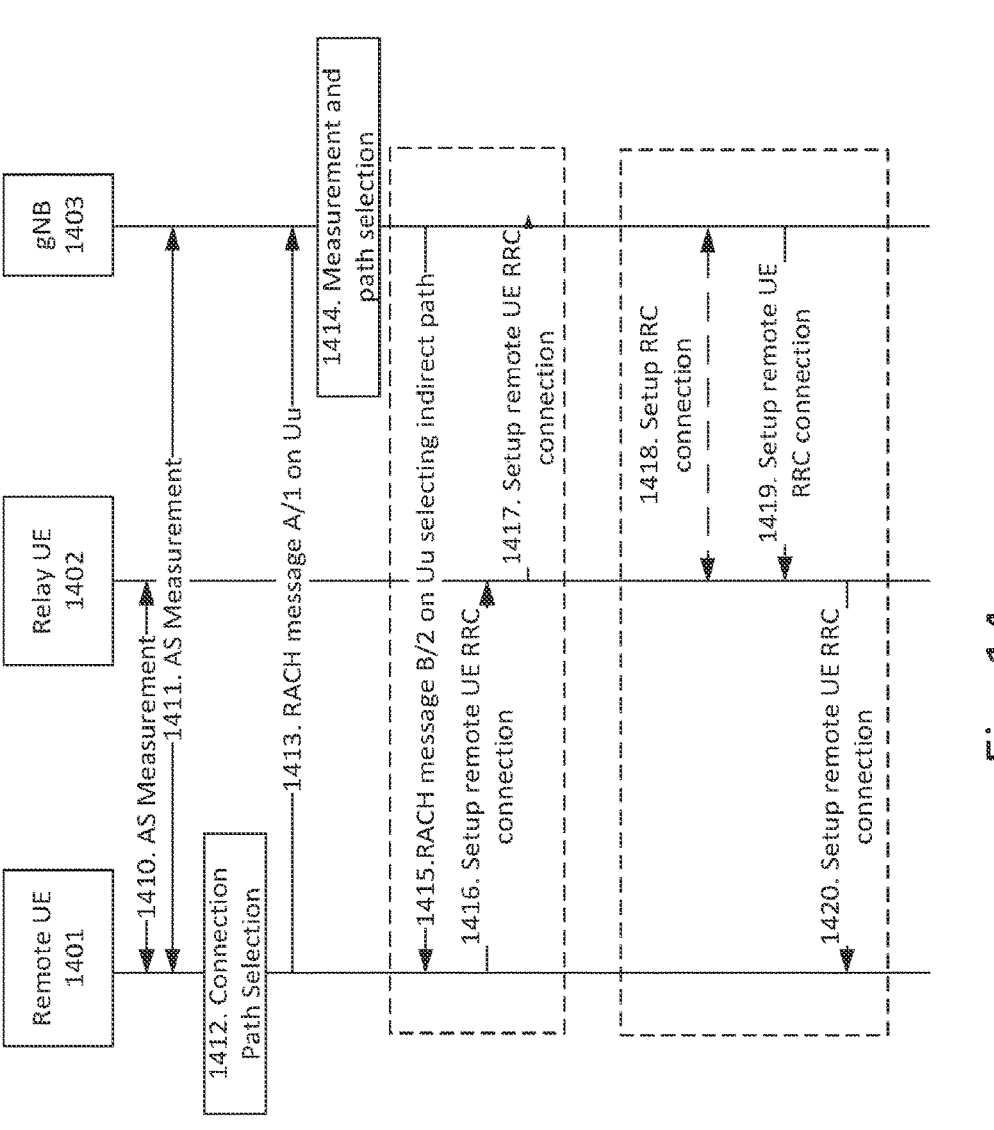
FIG. 14 shows an example remote UE connection path selection for Mobile Originated Traffic.

FIG. 14 shows an example method to determine the path(s) to establish the RRC connection between the gNB and remote UE for a mobile originated traffic 1400. At steps 1410 and 1411, the remote UE 1401 may periodically measure the RSRP and/or RSRQ of PC5 and Uu interfaces. The relay UE 1402 may also periodically report its traffic load, uplink rate and downlink rate to the remote UE 1401.

At step 1412, when the remote UE 1401 has MO traffic, it may select a path to establish an RRC connection with the gNB 1403 based on the QoS requirement of the traffic and the RSRP and/or RSRQ of PC5 and Uu interface (e.g., e.g., if the traffic requires low latency and the RSRP and/or RSRQ of the Uu interface is above a configured threshold). The remote UE 1401 may send the first RACH message to the gNB 1403 via the Uu interface as described in step 1413. In another example, if the traffic does not require low latency, or the RSRP and/or RSRQ of the Uu interface is below a configured threshold, and the RSRP and/or RSRQ of the sidelink is above a configured threshold, the remote UE 1401 may send a request to establish an RRC connection via the indirect link. The remote UE 1401 may also select a path to establish an RRC connection to the gNB based on traffic load, uplink rate, and downlink rate of the relay UE 1402. For example, the remote UE 1401 may select the direct path if the traffic load of the relay UE 1402 is below a configured threshold (pre-configured or provided by the gNB 1403), the uplink rate is above a configured threshold (pre-configured or provided by the gNB 1403), and/or downlink rate is above a configured threshold (pre-configured or provided by the gNB 1403). On the other hand, the remote UE 1401 may send a request to establish an RRC connection via a direct link if the RSRP and/or RSRQ of the sidelink is below a configured threshold, the RSRP and/or RSRQ of the Uu interface is above a configured threshold, the traffic load of the relay UE 1402 is above a configured threshold, the uplink rate is below a configured threshold, and/or downlink rate is below a configured threshold.

At step 1413, the remote UE 1402 may send a first RACH message to the gNB 1403 via the Uu interface. The message may also contain the QoS requirement of the MO traffic. The first RACH message may be a MsgA for a 2-step RACH, or a Msg1 or PRACH preamble for a 4-step RACH.

At step 1414, when the gNB 1403 receives the RACH message, the gNB 1403 may measure the link quality of the message. If the link quality of the message is below a configured threshold or cannot fulfill the QoS requirement of the traffic, the gNB 1403 may perform a path selection and establish the RRC connection via indirect path. For example, the gNB 1403 may send a RACH message (e.g., MsgB for 2-step RACH or Msg2 or RAR for 4-step RACH) to the remote UE 1401 indicating the selection of the indirect path, and the remote UE 1401 may initiate an RRC establishment request using the indirect path as described in steps 1415-1417. In another method, the gNB 1403 may initiate an RRC establishment with the remote UE 1401 using the indirect path as described in steps 1418-1420. If the relay UE 1402 is not in the RRC CONNECT state, the gNB 1403 may first set up an RRC connection with the relay UE 1402 in step 1420.

At step 1415, the gNB 1403 may send a RACH message B/2 to the remote UE 1401 indicating the selection of indirect path.

At step 1416, the remote UE 1401 may initiate an RRC establishment request using the indirect path.

At step 1417, the relay UE 1402 may forward the RRC establishment request to the gNB 1403.

At step 1418, the gNB 1403 and the relay UE 1402 may setup the RRC connection.

At step 1419, the gNB 1403 may send a request to setup the RRC connection with the remote UE 1401.

At step 1420, the relay UE 1402 may forward the request to setup the RRC connection with the remote UE 1401.

Methods are described herein to determine the path(s) to establish the RRC connection between the gNB and remote UE for mobile terminated traffic.

Figure 15:
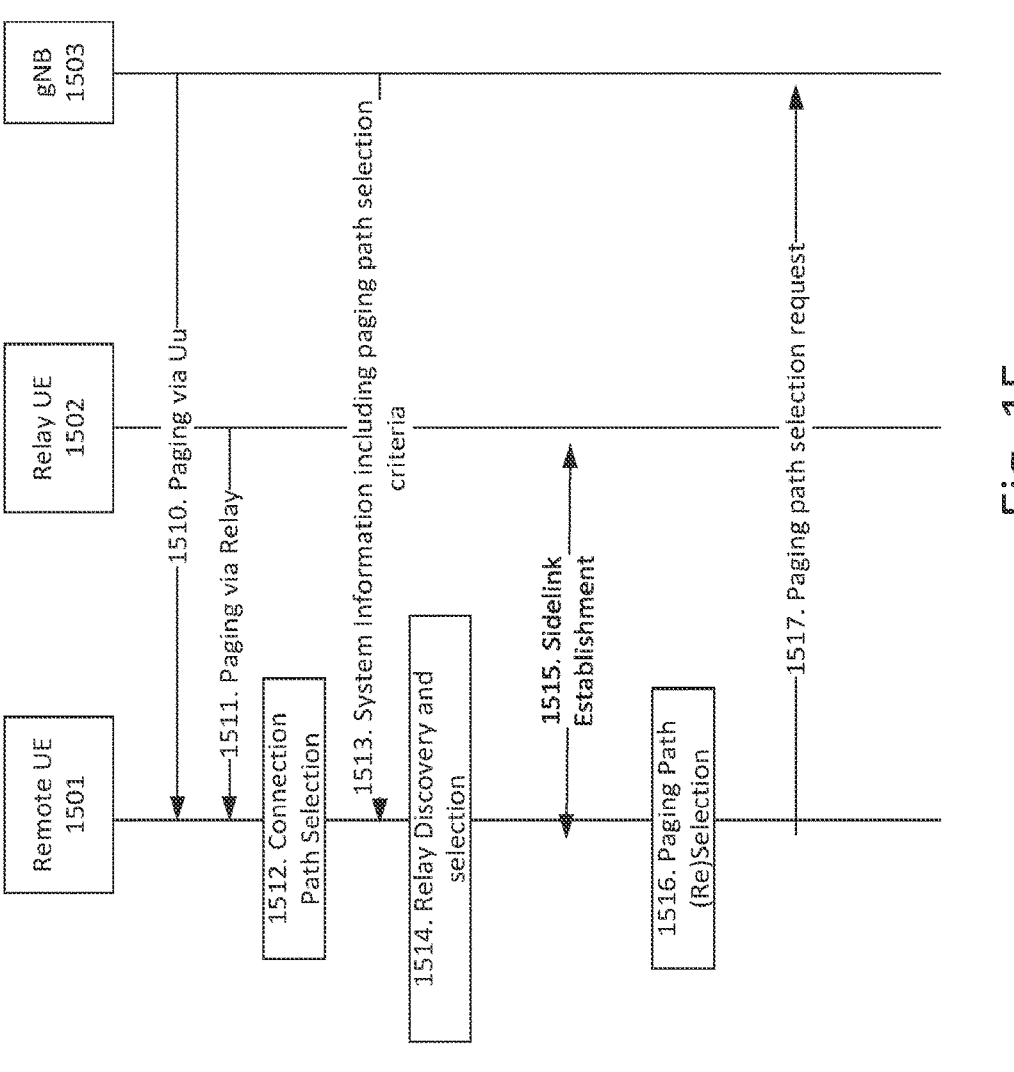
FIG. 15 shows an example remote UE connection path selection for Mobile Terminated Traffic initiated by Remote UE.

FIG. 15 shows a first example method to determine the path(s) to establish the RRC connection between the gNB and remote UE for mobile terminated traffic 1500. After receiving a paging message from the network at steps 1510-1511 (e.g., from gNB 1503 or relay UE 1502), the remote UE 1501 may select a path to establish an RRC connection with the gNB 1503 (step 1512). The remote UE 1501 may select the path that delivers the paging message to establish the RRC connection from the gNB 1503. If the paging message contains the QoS requirement of the traffic, the remote UE 1501 may select a path to establish the RRC connection with the gNB 1503 based on the QoS require-ment of the traffic and the RSRP and/or RSRQ of PC5 and Uu interface. At step 1513, the remote UE 1501 may receive system information from the gNB 1503. The system infor-mation may comprise the criteria for the remote UE 1501 to select its paging path. The gNB 1503 can indicate a thresh-old T_dis that the remote UE may start discovering a relay UE when the RSRP and/or RSRQ of the Uu interface is below T_dis. The gNB 1503 can indicate a threshold T_p_Uu that the remote UE 1501 may use an indirect path to receive paging when the RSRP and/or RSRQ of the Uu interface is below T_p_Uu. The gNB 1503 can indicate a threshold T_p_relay that the remote UE 1501 may use an indirect path to receive paging when the RSRP and/or RSRQ of the Uu interface is smaller than the PC5 interface by T_p_relay.

At step 1514, the remote UE 1501 may start discovering relay UEs when the RSRP and/or RSRQ of the Uu interface is below T_dis. The remote UE 1501 may select a relay UE 1502 to establish PC5-RRC connection.

At step 1515, the remote UE 1501 may establish sidelink communication via a PC5-RRC connection with the selected relay UE 1502.

At step 1516, the remote UE 1501 may make a paging path (re)selection decision based on criteria provided in the system information based RSRP and/or RSRQ of the Uu and the PC5 interface. For example, the remote UE 1501 may use an indirect path to receive paging when the RSRP and/or RSRQ of the Uu interface is below T_p_Uu. The remote UE 1501 may use a direct path to receive paging when the sidelink measurement quantity (e.g., SL RSRP, SL RSRQ, etc.) falls below a threshold (e.g., T_indirect_sl). In another example, the remote UE 1501 may use an indirect path to receive paging when the RSRP and/or RSRQ of the Uu interface is smaller than the link quality (e.g., SL RSRP and/or SL RSRQ, etc.) on the PC5 interface by T_p_relay. In yet another example, the remote UE 1501 may use an indirect path to receive paging when the RSRP and/or RSRQ of the Uu interface is smaller than the PC5 interface by T_p_relay and when the RSRP and/or RSRQ of the Uu interface is below T_p_Uu. The remote UE 1501 may also make the paging path (re)selection decision based on the traffic load of the relay UE 1502. The remote UE 1501 may use the direct path if the traffic load of the relay UE 1502 is below a configured threshold (pre-configured or provided by the gNB).

At step 1517, in the scenario that the remote UE 1501 decides to use an indirect path to receive a paging message, it may send a paging path selection request to the gNB 1503. In the scenario that the remote UE 1501 decides to stop using the indirect path to receive paging messages, it may send a paging path selection request to the gNB 1503.

Figure 16:
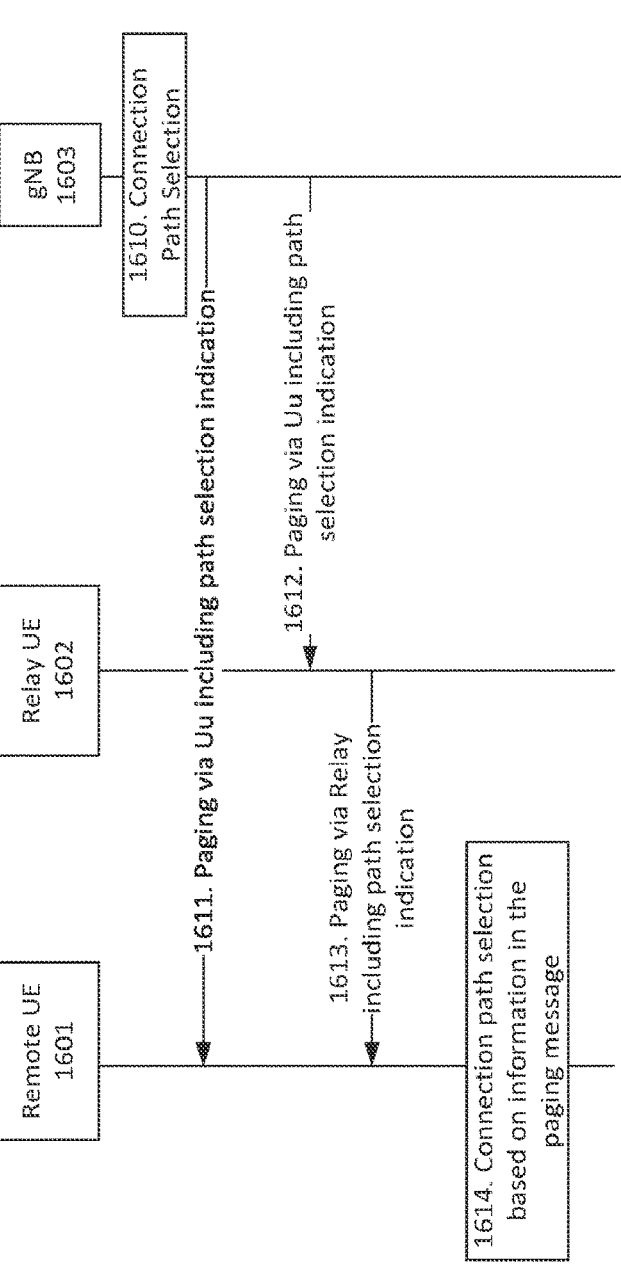
FIG. 16 shows an example remote UE connection path selection for Mobile Terminated Traffic initiated by the gNB.

FIG. 16 shows an example method in which the gNB may select a path to establish RRC connection to the remote UE 1600. At step 1610, the gNB 1603 may select a path to establish an RRC connection with a remote UE 1601. For example, the gNB 1603 may select a path to establish an RRC connection with the remote UE 1601 based on the QoS requirements of the traffic. For example, if the traffic has stringent latency requirements, the gNB 1603 may choose the direct path. At step 1611, the gNB may send a paging message to the remote UE 1601. The paging message may contain a path selection indication about which path(s) to use for establishing RRC connection to the remote UE. The paging message may be sent via direct or indirect path. At step 1612, the gNB may send a paging message to the relay UE 1602. The paging message may contain the path selection indication. At step 1613, the relay UE 1602 may send a paging message including the path selection indication. At step 1614, when the remote UE 1601 receives the paging message, it may send a request to establish the RRC connection using the path(s) indicated in the paging message.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 17A:
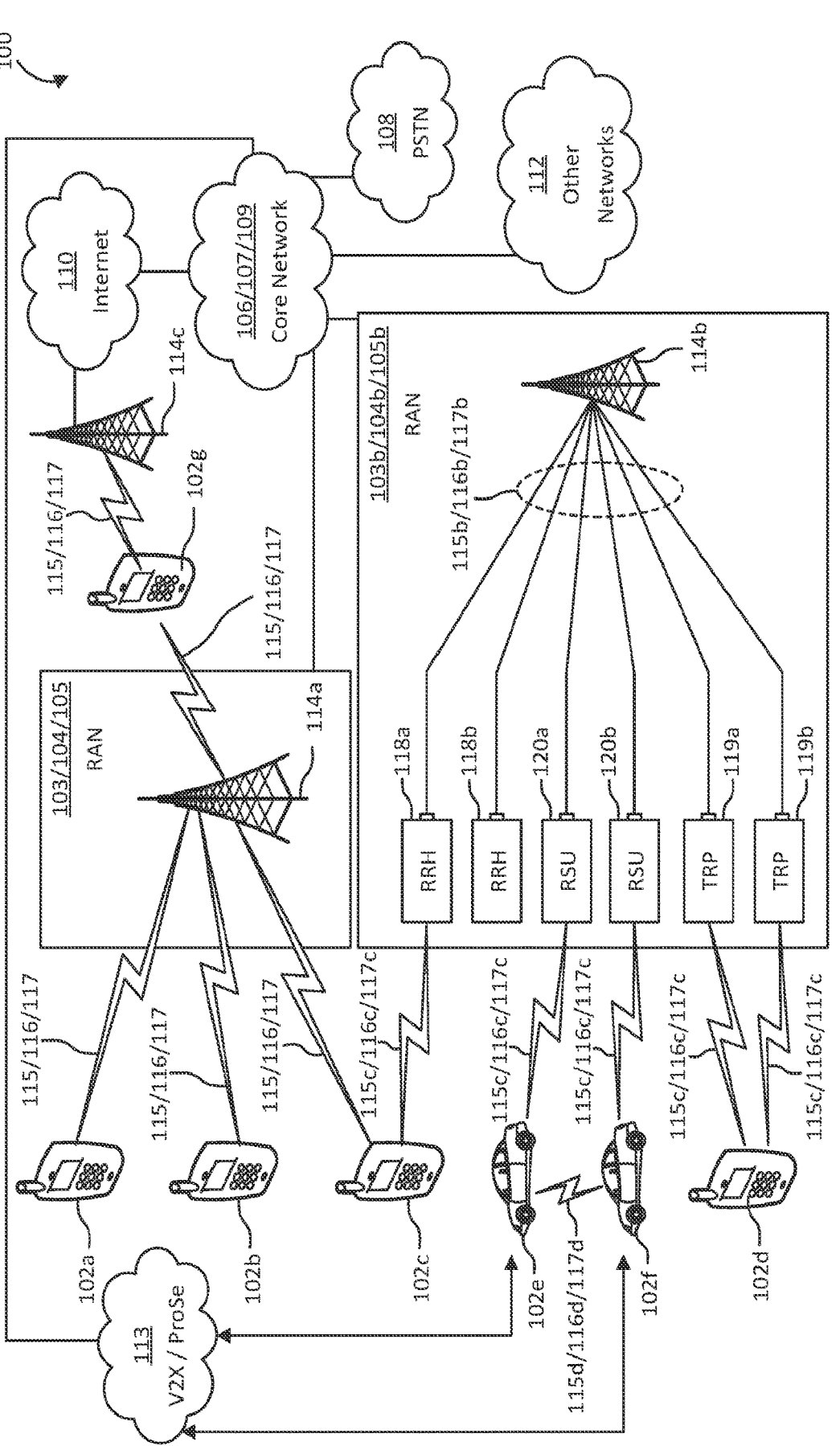
FIG. 17A illustrates one embodiment of an example communications system in which the methods and apparatuses described and claimed herein may be embodied.

FIG. 17A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 17A-17E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b, TRPs 119a, 119b, and/or RSUs 120a, 120b, in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114a in the RAN 103/104/105 and the WTRUs 102a, 102b, 102c, or RRHs 118a, 118b, TRPs 119a, 119b and/or RSUs 120a, 120b, in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 17A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 17A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 17A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 17A may be configured to communicate with the base station 114a, which may employ a cellular-based radio technology, and with the base station 114c, which may employ an IEEE 802 radio technology.

Figure 17B:
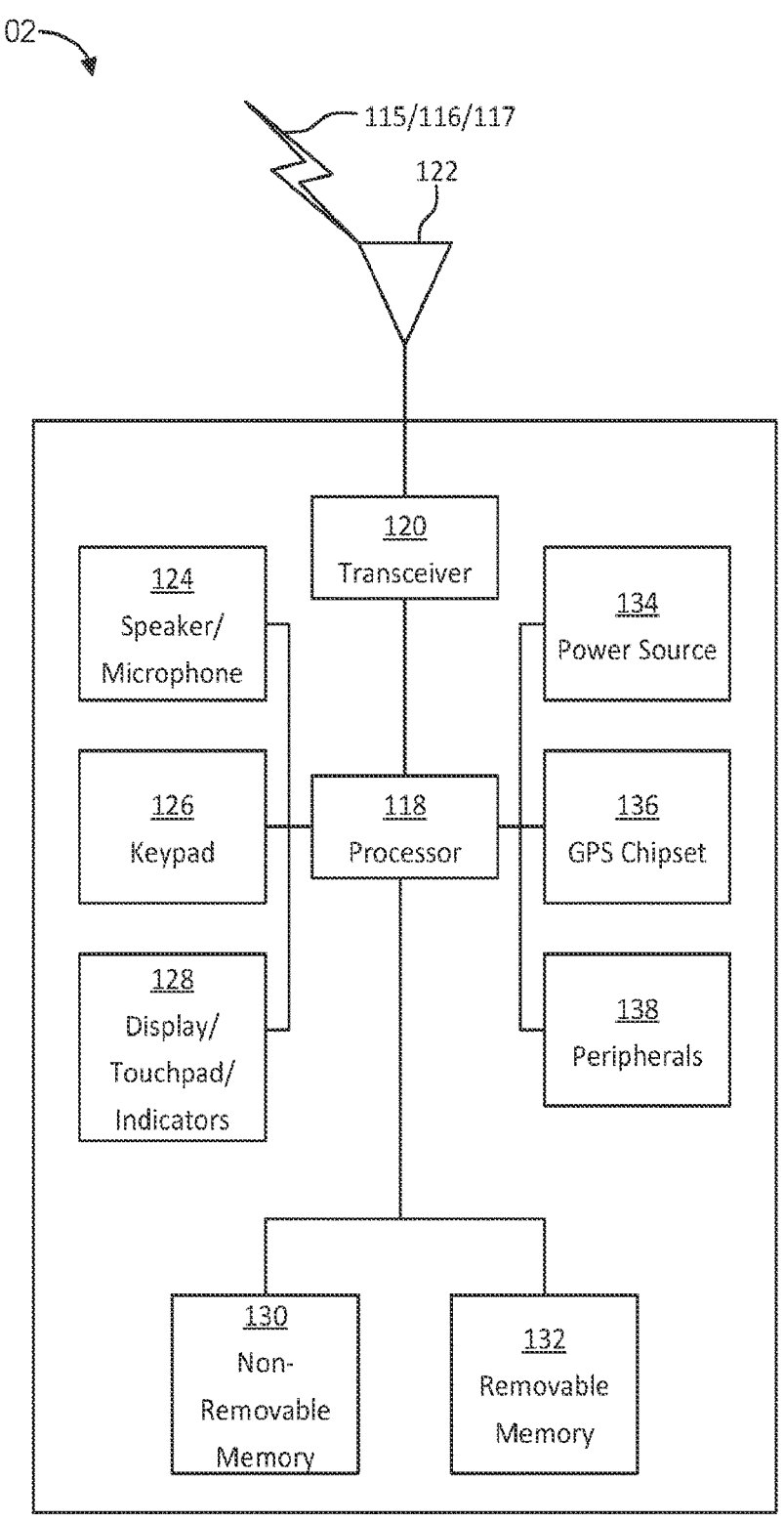
FIG. 17B is a block diagram of an example apparatus or device configured for wireless communications in accordance with the embodiments illustrated herein, such as for example, a wireless transmit/receive unit (WTRU)

FIG. 17B is a block diagram of an example apparatus or device configured for wireless communications in accordance with the embodiments illustrated herein, such as for example, a WTRU 102. As shown in FIG. 17B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 17B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 17B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 17B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 17C:
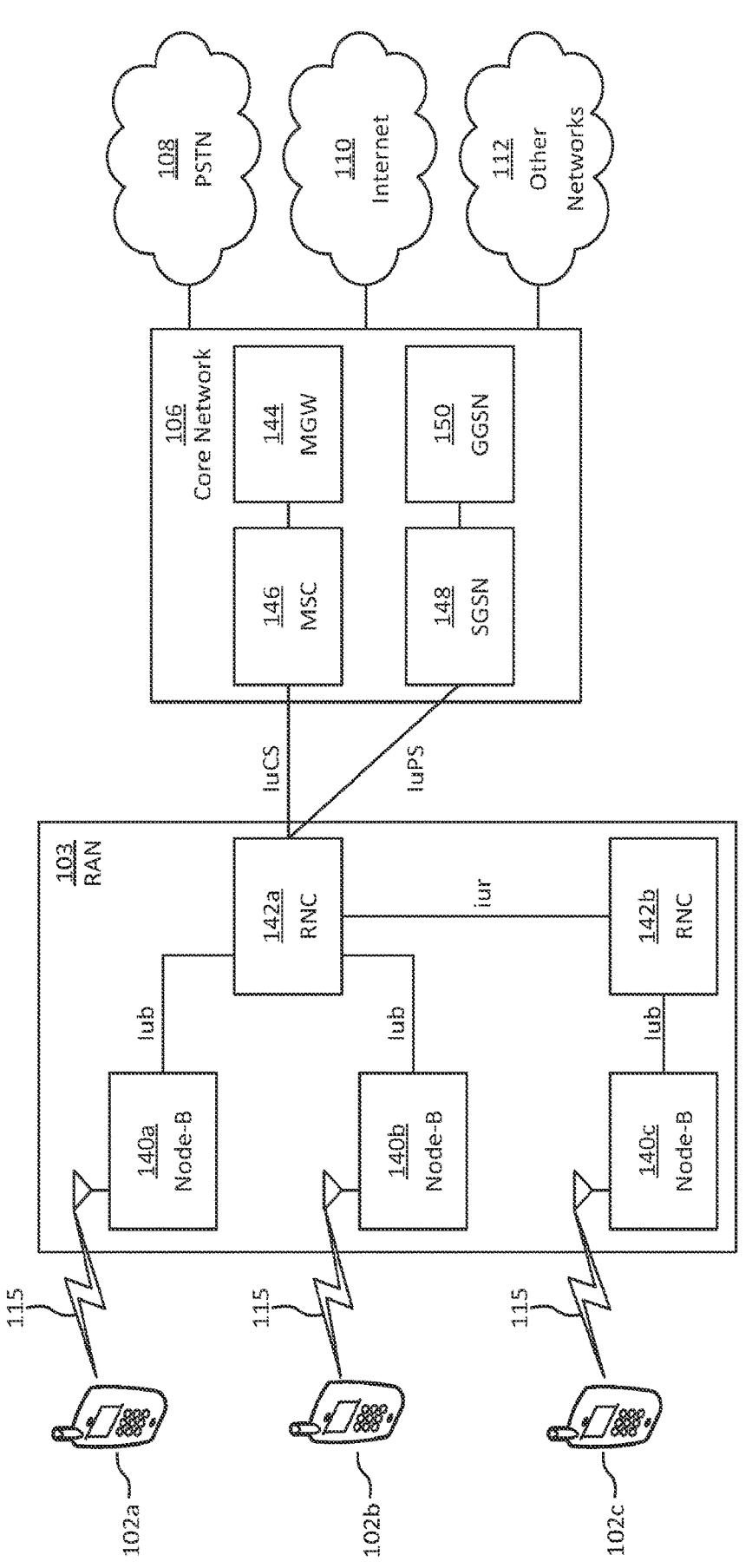
FIG. 17C is a system diagram of a RAN and a core network according to an embodiment.

FIG. 17C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 17C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 17C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 17C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 17D:
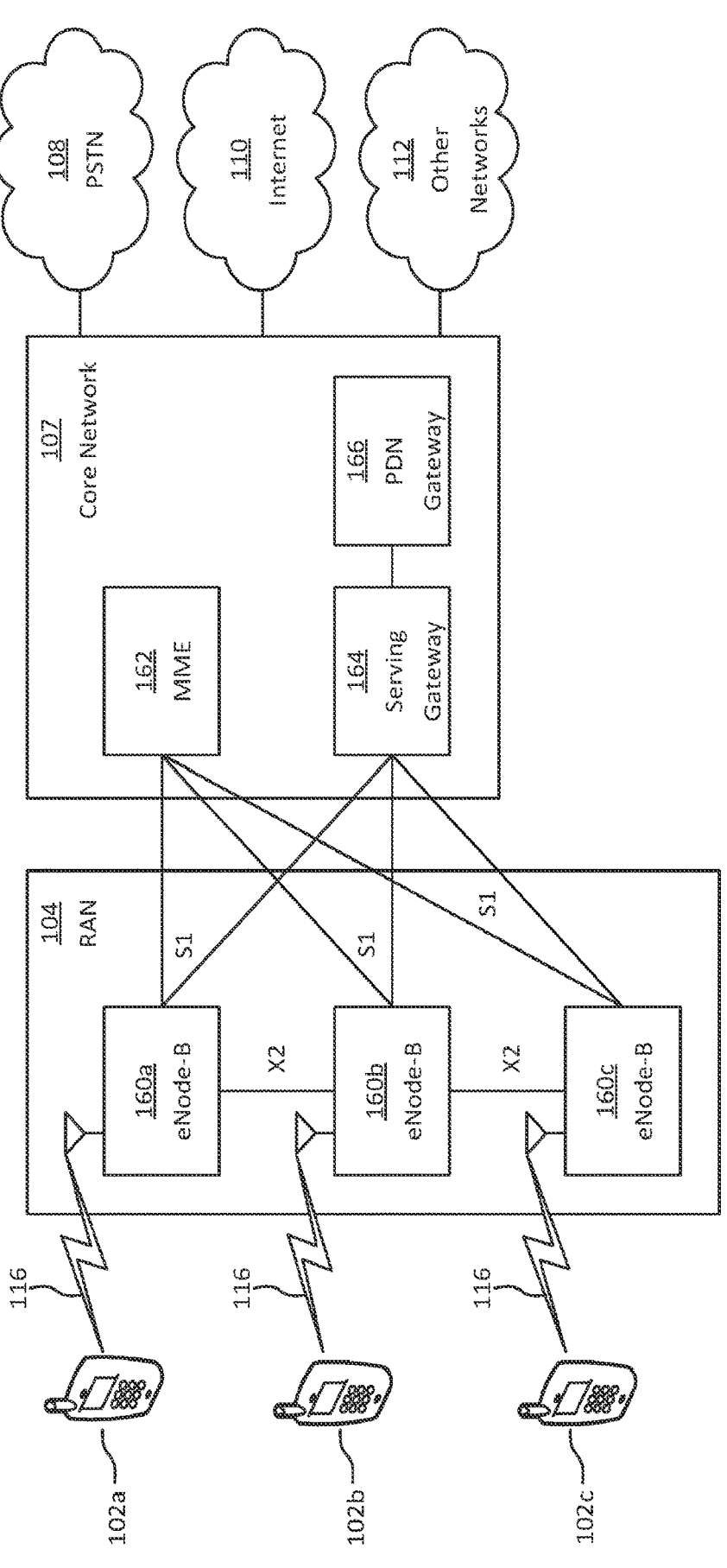
FIG. 17D is a system diagram of a RAN and a core network according to an embodiment.

FIG. 17D is a system diagram of the RAN 104 and the core network 107 according to an embodiment. As noted above, the RAN 104 may employ an E-UTRA radio technology to communicate with the WTRUs 102a, 102b, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 17D, the eNode-Bs 160*a*, 160*b*, 160*c* may communicate with one another over an X2 interface.

The core network 107 shown in FIG. 17D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 17E:
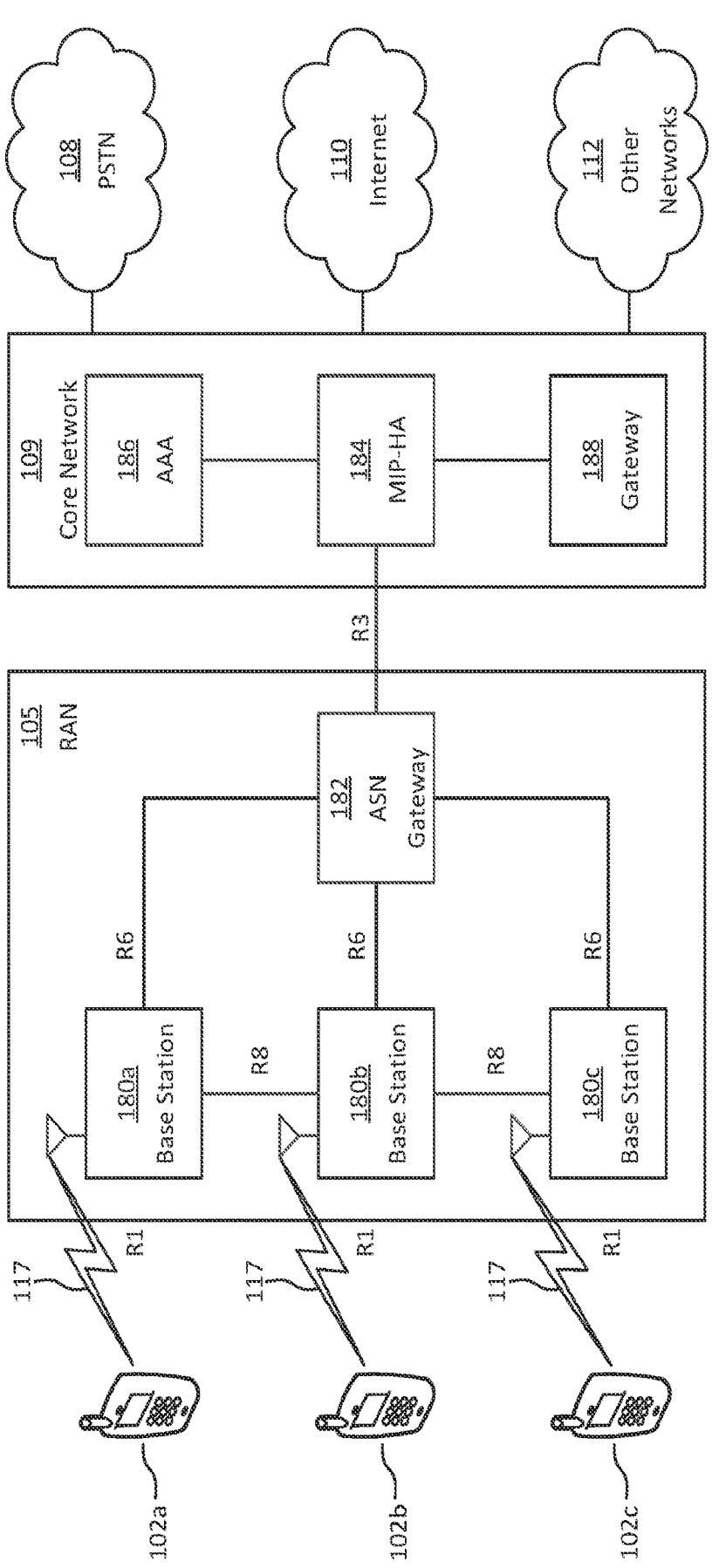
FIG. 17E is a system diagram of a RAN and the core network according to an embodiment.

FIG. 17E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 17E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 17E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 17E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 17A, 17C, 17D, and 17E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 17A, 17B, 17C, 17D, and 17E are provided by way of example only, and it is understood that the subject matter disclosed and claimed herein may be embodied or implemented in any similar communication system, whether presently defined or defined in the future.

Figure 17F:
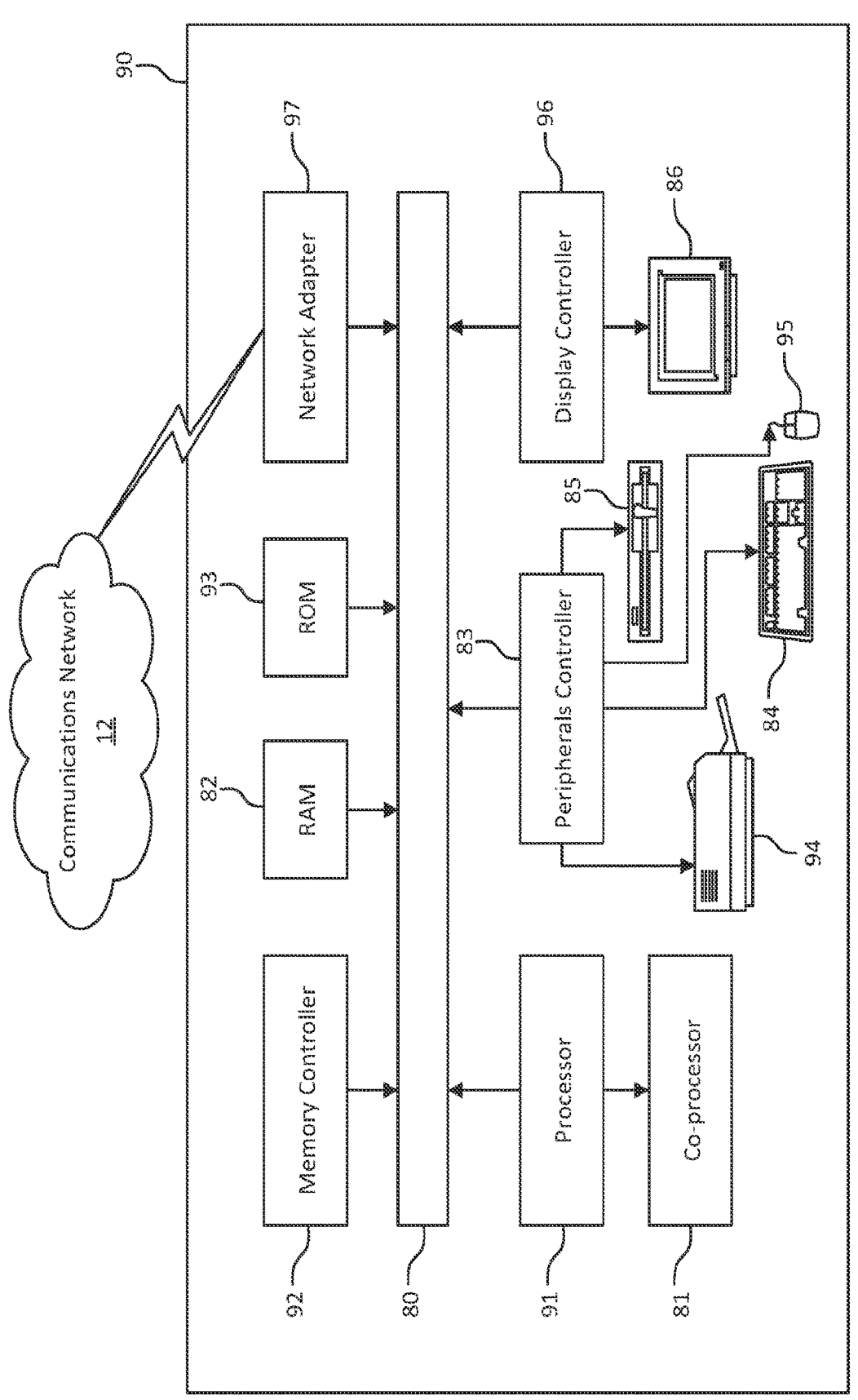
FIG. 17F is a block diagram of an exemplary computing system in which one or more apparatuses of the communications networks illustrated in FIGS. 36A, 36C, 36D and 36E may be embodied.

FIG. 17F is a block diagram of an exemplary computing system 90 in which one or more apparatuses of the communications networks illustrated in FIGS. 17A, 17C, 17D and 17E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 17A, 17B, 17C, 17D, and 17E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 17G:
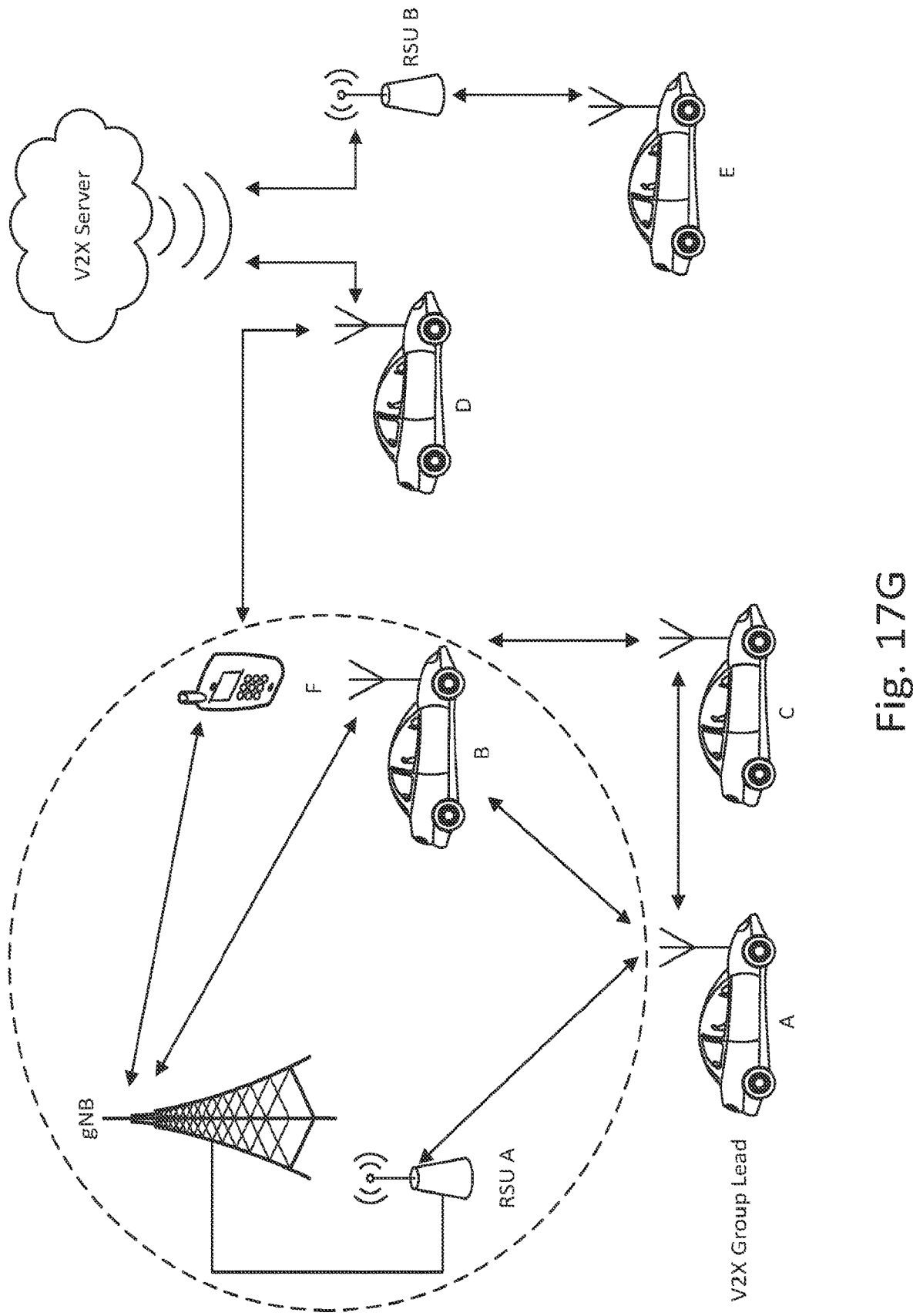
FIG. 17G illustrates one embodiment of an example communications system in which the methods and apparatuses described and claimed herein may be embodied.

FIG. 17G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), comprising a transceiver and one or more processors, configured to:

receive paging path selection criteria;

select a frequency for use in searching for a cell to establish a direct path of communication;

determine that there is no suitable cell associated with the frequency;

based on the determination that there is no suitable cell associated with the frequency, determine that one or more relay WTRUs are communicating via a sidelink channel;

select, based on one or more criteria, a relay WTRU from the one or more relay WTRUs;

establish an indirect communication path via the selected relay WTRU; and select, based on the paging path selection criteria, a paging path.

2. The WTRU of claim 1, wherein the one or more criteria comprise one or more of: a PLMN ID of the one or more relay WTRUs, access restrictions associated with a serving cell of the one or more relay WTRUs, a tracking area of the one or more relay WTRUs.

3. The WTRU of claim 1, further configured to:

receive a cell reselection frequency priority.

4. The WTRU of claim 3, further configured to:

if a highest priority frequency indicated by the cell reselection frequency priority is an intra-frequency, measure a signal quality of the indirect communication path via the selected relay WTRU.

5. The WTRU of claim 4, further configured to:

if the signal quality is below a threshold, perform a cell reselection procedure.

6. The WTRU of claim 5, wherein the cell reselection procedure includes evaluation of the one or more relay WTRUs that are communicating via the sidelink channel.

7. The WTRU of claim 1, further configured to:

send, to a base station, an indication of the selected paging path.

8. The WTRU of claim 7, further configured to:

receive, from the base station, a confirmation that the selected paging path is configured.

9. The WTRU of claim 7, wherein the selected paging path is the indirect communication path via the selected relay WTRU.

10. The WTRU of claim 7, wherein the selected paging path is a direct communication path with the base station.

11. A method for use in a wireless transmit/receive unit (WTRU), the method comprising:

receiving paging path selection criteria;

selecting a frequency for use in searching for a cell to establish a direct path of communication;

determining that there is no suitable cell associated with the frequency;

based on the determination that there is no suitable cell associated with the frequency, determining that one or more relay WTRUs are communicating via a sidelink channel;

selecting, based on one or more criteria, a relay WTRU from the one or more relay WTRUs;

establishing an indirect communication path via the selected relay WTRU; and selecting, based on the paging path selection criteria, a paging path.

12. The method of claim 11, wherein the one or more criteria comprise one or more of: a PLMN ID of the one or more relay WTRUs, access restrictions associated with a serving cell of the one or more relay WTRUs, a tracking area of the one or more relay WTRUs.

13. The method of claim 11, further comprising:

receiving a cell reselection frequency priority.

14. The method of claim 13, further comprising:

in response to detecting that a highest priority frequency indicated by the cell reselection frequency priority is an intra-frequency, measuring a signal quality of the indirect communication path via the selected relay WTRU.

15. The method of claim 14, further comprising:

in response to detecting that the signal quality is below a threshold, performing a cell reselection procedure.

16. The method of claim 15, wherein the cell reselection procedure includes evaluation of the one or more relay WTRUs that are communicating via the sidelink channel.

17. The method of claim 11, further comprising:

sending, to a base station, an indication of the selected paging path.

18. The method of claim 17, further comprising:

receiving, from the base station, a confirmation that the selected paging path is configured.

19. The method of claim 17, wherein the selected paging path is the indirect communication path via the selected relay WTRU.

20. The method of claim 17, wherein the selected paging path is a direct communication path with the base station.

* * * * *